United States Patent
Prabu et al.

(10) Patent No.: US 8,782,098 B2
(45) Date of Patent: **\*Jul. 15, 2014**

(54) USING TASK SEQUENCES TO MANAGE DEVICES

(75) Inventors: Munisamy Prabu, Redmond, WA (US); Michael J. Gallop, Sammamish, WA (US); Raymond D. Pedrizetti, Sammamish, WA (US); Curt A. Steeb, Redmond, WA (US); Zeyong Xu, Issaquah, WA (US); Paul C. Sutton, Seattle, WA (US); Martin L. Holladay, Bremerton, WA (US)

(73) Assignee: Microsoft Corporation, Redmond, WA (US)

( * ) Notice: Subject to any disclaimer, the term of this patent is extended or adjusted under 35 U.S.C. 154(b) by 427 days.

This patent is subject to a terminal disclaimer.

(21) Appl. No.: 12/874,014

(22) Filed: Sep. 1, 2010

(65) Prior Publication Data
US 2010/0333086 A1 Dec. 30, 2010

Related U.S. Application Data

(63) Continuation of application No. 10/607,054, filed on Jun. 25, 2003, now Pat. No. 7,814,126.

(51) Int. Cl.
*G06F 7/00* (2006.01)
*G06F 17/30* (2006.01)
*G06F 9/445* (2006.01)
*H04L 12/24* (2006.01)

(52) U.S. Cl.
CPC ............... *G06F 8/61* (2013.01); *H04L 41/0233* (2013.01)
USPC ........... 707/804; 717/176; 717/177; 717/178; 709/222

(58) Field of Classification Search
CPC ..... G06F 8/61; G06F 9/4416; H04L 41/0233; H04L 41/046
USPC ............ 707/804; 717/176, 177, 178; 709/222
See application file for complete search history.

(56) References Cited

U.S. PATENT DOCUMENTS

| | | |
|---|---|---|
| 5,142,680 A | 8/1992 | Ottman et al. |
| 5,367,635 A | 11/1994 | Bauer et al. |
| 5,404,527 A | 4/1995 | Irwin et al. |
| 5,717,930 A | 2/1998 | Imai et al. |
| 5,758,165 A | 5/1998 | Shuff |
| 5,845,078 A | 12/1998 | Tezuka et al. |
| 5,974,258 A | 10/1999 | Ferri et al. |
| 5,978,590 A | 11/1999 | Imai et al. |

(Continued)

OTHER PUBLICATIONS

"Advisory Action", U.S. Appl. No. 10/607,115, (Nov. 1, 2005), 3 pages.

(Continued)

*Primary Examiner* — Shew-Fen Lin
(74) *Attorney, Agent, or Firm* — Jim Sfekas; Kate Drakos; Micky Minhas

(57) ABSTRACT

Task sequences are used to manage devices. According to one aspect, a user-defined or user-selected task sequence is received. The task sequence is converted into an ordered series of steps, and the series of steps are performed, in accordance with their order, in managing a device over a network. In certain implementations, the ordered series of steps are steps for automatically deploying an operating system on the device.

19 Claims, 16 Drawing Sheets

(56) References Cited

U.S. PATENT DOCUMENTS

| | | | |
|---|---|---|---|
| 6,009,274 A | 12/1999 | Fletcher et al. | |
| 6,012,088 A | 1/2000 | Li et al. | |
| 6,112,243 A | 8/2000 | Downs et al. | |
| 6,128,734 A | 10/2000 | Gross et al. | |
| 6,138,234 A | 10/2000 | Lee et al. | |
| 6,202,206 B1 | 3/2001 | Dean et al. | |
| 6,209,089 B1* | 3/2001 | Selitrennikoff et al. | 713/2 |
| 6,236,983 B1* | 5/2001 | Hofmann et al. | 706/47 |
| 6,292,641 B1 | 9/2001 | Takeyama et al. | |
| 6,292,941 B1 | 9/2001 | Jollands | |
| 6,324,578 B1 | 11/2001 | Cox et al. | |
| 6,381,742 B2 | 4/2002 | Forbes et al. | |
| 6,389,589 B1 | 5/2002 | Mishra et al. | |
| 6,401,238 B1 | 6/2002 | Brown et al. | |
| 6,421,777 B1* | 7/2002 | Pierre-Louis et al. | 713/2 |
| 6,449,642 B2 | 9/2002 | Bourke-Dunphy et al. | |
| 6,457,076 B1 | 9/2002 | Cheng et al. | |
| 6,466,972 B1 | 10/2002 | Paul et al. | |
| 6,468,160 B2 | 10/2002 | Eliott | |
| 6,557,100 B1 | 4/2003 | Knutson | |
| 6,560,776 B1 | 5/2003 | Breggin et al. | |
| 6,578,142 B1 | 6/2003 | Anderson et al. | |
| 6,687,902 B1 | 2/2004 | Curtis et al. | |
| 6,712,704 B2 | 3/2004 | Eliott | |
| 6,754,816 B1 | 6/2004 | Layton et al. | |
| 6,763,456 B1 | 7/2004 | Agnihotri et al. | |
| 6,769,989 B2 | 8/2004 | Smith et al. | |
| 6,779,016 B1 | 8/2004 | Aziz et al. | |
| 6,782,408 B1 | 8/2004 | Chandra et al. | |
| 6,813,708 B2 | 11/2004 | Smith et al. | |
| 6,836,750 B2 | 12/2004 | Wong et al. | |
| 6,847,970 B2 | 1/2005 | Kar et al. | |
| 6,854,112 B2 | 2/2005 | Crespo et al. | |
| 6,880,002 B2 | 4/2005 | Hirschfeld et al. | |
| 6,895,534 B2 | 5/2005 | Wong et al. | |
| 6,910,103 B2 | 6/2005 | Danan | |
| 6,922,791 B2 | 7/2005 | Mashayekhi et al. | |
| 6,944,662 B2 | 9/2005 | Devine et al. | |
| 6,948,099 B1 | 9/2005 | Tallam | |
| 6,963,981 B1 | 11/2005 | Bailey et al. | |
| 6,976,062 B1 | 12/2005 | Denby et al. | |
| 6,986,033 B2 | 1/2006 | Miyamoto et al. | |
| 6,990,666 B2 | 1/2006 | Hirschfeld et al. | |
| 6,996,706 B1* | 2/2006 | Madden et al. | 713/2 |
| 7,013,462 B2 | 3/2006 | Zara et al. | |
| 7,058,826 B2 | 6/2006 | Fung | |
| 7,058,858 B2 | 6/2006 | Wong et al. | |
| 7,069,428 B2 | 6/2006 | Miyamoto et al. | |
| 7,076,633 B2 | 7/2006 | Tormasov et al. | |
| 7,082,464 B2 | 7/2006 | Hasan et al. | |
| 7,093,005 B2 | 8/2006 | Patterson | |
| 7,124,289 B1 | 10/2006 | Suorsa | |
| 7,127,625 B2 | 10/2006 | Farkas et al. | |
| 7,131,123 B2* | 10/2006 | Suorsa et al. | 717/177 |
| 7,134,011 B2 | 11/2006 | Fung | |
| 7,139,930 B2 | 11/2006 | Mashayekhi et al. | |
| 7,143,420 B2 | 11/2006 | Radhakrishnan | |
| 7,146,353 B2 | 12/2006 | Garg et al. | |
| 7,152,109 B2 | 12/2006 | Suorsa et al. | |
| 7,152,157 B2 | 12/2006 | Murphy et al. | |
| 7,194,439 B2 | 3/2007 | Kassan et al. | |
| 7,194,616 B2 | 3/2007 | Axnix et al. | |
| 7,225,441 B2 | 5/2007 | Kozuch et al. | |
| 7,231,410 B1 | 6/2007 | Walsh et al. | |
| 7,234,053 B1 | 6/2007 | Mahmoud | |
| 7,237,023 B2 | 6/2007 | Menard et al. | |
| 7,257,584 B2 | 8/2007 | Hirschfeld et al. | |
| 7,278,273 B1 | 10/2007 | Whitted et al. | |
| 7,281,154 B2 | 10/2007 | Mashayekhi et al. | |
| 7,290,258 B2 | 10/2007 | Steeb et al. | |
| 7,302,608 B1 | 11/2007 | Acharya et al. | |
| 7,313,573 B2 | 12/2007 | Leung et al. | |
| 7,333,000 B2 | 2/2008 | Vassallo | |
| 7,349,891 B2 | 3/2008 | Charron et al. | |
| 7,350,068 B2 | 3/2008 | Anderson et al. | |
| 7,350,186 B2 | 3/2008 | Coleman et al. | |
| 7,367,017 B2 | 4/2008 | Maddocks et al. | |
| 7,814,126 B2 | 10/2010 | Prabu | |
| 2002/0002704 A1 | 1/2002 | Davis et al. | |
| 2002/0069369 A1 | 6/2002 | Tremain | |
| 2002/0124245 A1* | 9/2002 | Maddux et al. | 717/176 |
| 2002/0161868 A1 | 10/2002 | Paul | |
| 2002/0191014 A1 | 12/2002 | Hsieh et al. | |
| 2002/0198972 A1* | 12/2002 | Babbitt et al. | 709/222 |
| 2003/0005096 A1 | 1/2003 | Paul et al. | |
| 2003/0018870 A1 | 1/2003 | Abboud et al. | |
| 2003/0023839 A1 | 1/2003 | Burkhardt et al. | |
| 2003/0037033 A1 | 2/2003 | Nyman et al. | |
| 2003/0046682 A1 | 3/2003 | Crespo et al. | |
| 2003/0065828 A1* | 4/2003 | Danan | 709/328 |
| 2003/0084342 A1 | 5/2003 | Girard | |
| 2003/0097422 A1* | 5/2003 | Richards et al. | 709/217 |
| 2003/0120624 A1* | 6/2003 | Poppenga et al. | 707/1 |
| 2003/0120709 A1 | 6/2003 | Pulsipher et al. | |
| 2003/0120710 A1 | 6/2003 | Pulsipher et al. | |
| 2003/0120827 A1 | 6/2003 | Fulginiti et al. | |
| 2003/0195995 A1 | 10/2003 | Tabbara | |
| 2003/0200428 A1 | 10/2003 | Chan et al. | |
| 2004/0015581 A1 | 1/2004 | Forbes | |
| 2004/0162137 A1 | 8/2004 | Eliott | |
| 2004/0226010 A1 | 11/2004 | Suorsa | |

OTHER PUBLICATIONS

"Appendix D (Server Clusters: Remote Setup, Unattended Installations and Image Installations)", Retrieved on Oct. 2, 2006 from <<http://technet2.microsoft.com/windowsserver/en/library/6e8b36d4-f6e9-4b9b-b471-1e6acc74d7721033>>, Microsoft Technet, Microsoft Corp,(Jan. 1, 2003),3 pages.

"Complete Pre-Upgrade Tasks", Retrieved on Oct. 24, 2006 from <<http://technet2.microsoft.com/windwsserver/en/library/0cd4a9b4-c30f-4d6f-8201-90dbgc16155a11033.mxpx?pf=true>>, Microsoft Technet, Microsoft Corp,(Mar. 23, 2003),1 page.

"Final Office Action", U.S. Appl. No. 10/607,054, (Jan. 15, 2010),20 pages.

"Final Office Action", U.S. Appl. No. 10/607,054, (May 1, 2009),17 pages.

"Final Office Action", U.S. Appl. No. 10/607,054, (Apr. 10, 2007),18 pages.

"Final Office Action", U.S. Appl. No. 10/607,054, (Jun. 26, 2008),19 pages.

"Final Office Action", U.S. Appl. No. 10/607,115, (Jun. 16, 2005),21 pages.

"Final Office Action", U.S. Appl. No. 10/607,115, (Feb. 7, 2007),20 pages.

"Final Office Action", U.S. Appl. No. 10/607,411, (May 14, 2010),20 pages.

"Final Office Action", U.S. Appl. No. 10/607,411, (Dec. 8, 2008),42 pages.

"HP Blade Server BH Series Operating System Guide", Hewlett-Packard,(Jul. 2002),pp. 1-69.

"Image-based Installation of Operating System and the Cluster Service using Automated Deployment Services (ADS)", Retrieved on Oct. 1, 2006 from <<http://technet2.microsoft.com/windows5werver/en/library/ba672f36-2a9d43d2-9737ab50db8b71b1033.mspx?mfr=true>>, Microsoft Technet, Microsoft Corp,(Jan. 1, 2003),pp. 1-12.

"Lab: Automated Deployment Services", Retrieved at <<http://supportech.insalyon.fr/Download/HOL/TechEd03/Windows/Deployment.pdf>>, (Jun. 16, 2003),17 pages.

"Non Final Office Action", U.S. Appl. No. 10/607,054, (Oct. 11, 2006),17 pages.

"Non Final Office Action", U.S. Appl. No. 10/607,054, (Dec. 6, 2007),19 pages.

"Non Final Office Action", U.S. Appl. No. 10/607,054, (Dec. 9, 2008),20 pages.

"Non Final Office Action", U.S. Appl. No. 10/607,054, (Apr. 7, 2006),16 pages.

"Non-Final Office Action", U.S. Appl. No. 10/607,115, (Aug. 16, 2004),19 pages.

(56) References Cited

OTHER PUBLICATIONS

"Non-Final Office Action", U.S. Appl. No. 10/607,115, (Aug. 24, 2006),20 pages.
"Non-Final Office Action", U.S. Appl. No. 10/607,411, (Apr. 10, 2007),26 pages.
"Non-Final Office Action", U.S. Appl. No. 10/607,411, (Apr. 16, 2008),36 pages.
"Non-Final Office Action", U.S. Appl. No. 10/607,411, (Jun. 3, 2009),29 pages.
"Non-Final Office Action", U.S. Appl. No. 10/607,411, (Nov. 25, 2009),28 pages.
"Non-Final Office Action", U.S. Appl. No. 10/607,054, (Aug. 24, 2009),25 pages.
"Notice of Allowance", U.S. Appl. No. 10/607,054, (Jul. 6, 2010),19 pages.
"Notice of Allowance", U.S. Appl. No. 10/607,115, (Jul. 30, 2007),8 pages.
"Preboot Execution Environment (PXE) Specification", Version 2.1, Intel Corporation, (Sep. 20, 1999),103 pages.
Ardaiz, et al., "Multicast Injection for Application Network Deployment", *IEEE 2001*, (2001),pp. 386-394.
Croft, et al., "Bootstrap Protocol (BOOTP)", *Network Working Group*, RFC 951, (Sep. 1985),pp. 1-12.
Lammermann, S. "Dynamic Composition of Services", *Abstract only; Proceedings of International Conference on Complex Systems: Control and Modeling Problems*, Sep. 4-9, 2001,1 page.
Mannaert, et al., "Web Portal for Multicast Delivery Management", *Internet Research: Electronic Networking Applications and Policy*, v. 12, No. 2, (2003),pp. 94-99.
Sharma, et al., "IP Multicast Operational Network Management: Design, Challenges, and Experiences", *IEEE Network*, (Mar./Apr. 2003),pp. 49-55.
Wong et al., "An Architectural Infrastructure and TOpological Optimization for End System Multicast", *Proceedings of the Tenth IEEE Int'l SYmposium on and Simulation of COmputer & Telecommunications Systems*, (2002),8 pages.
"Non-Final Office Action", U.S. Appl. No. 10/607,411, (Dec. 9, 2010),18 pages.
"Notice of Allowance", U.S. Appl. No. 10/607,411, (Aug. 16, 2011), 8 pages.

\* cited by examiner

USING TASK SEQUENCES TO MANAGE DEVICES

RELATED APPLICATIONS

This application is a continuation of, claims priority to, and incorporates by reference in its entirety, co-pending U.S. patent application Ser. No. 10/607,054, filed Jun. 25, 2003, entitled "Using Task Sequences to Manage Devices".

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the object models and sample code as described below: Copyright ©2003, Microsoft Corporation.

TECHNICAL FIELD

This invention relates to networks and device management, and more particularly to using task sequences to manage devices.

BACKGROUND

Computers typically operate under the control of software referred to as an operating system. The operating system may be installed on a computer by the computer manufacturer or distributor, or may be installed by the purchaser. Additionally, as new operating systems become available over time, it is often desirable to upgrade from one operating system to a newer operating system.

Given the size and complexity of many modern operating systems, the installation of an operating system on a computer can be a very time-consuming process for the user. Installing additional software on the computer after the operating system is installed makes the installation even more time-consuming. Furthermore, as the number of computers on which operating systems are being installed increases, the amount of time necessary to install the operating systems on all of the computers similarly increases. This is particularly true in a data center (such as an Internet data center (IDC) or an Enterprise Data Center (EDC)), which is a specifically designed complex that houses many computers for hosting network-based services. Data centers, which may also go by the names of "Webfarms" or "server farms", typically house hundreds to thousands of computers in climate-controlled, physically secure buildings. Data centers provide reliable Internet access, reliable power supplies, and a secure operating environment.

In addition to the time taken to install the operating system and applications on multiple servers, the process often involves many manual steps. These steps, being manual, are both expensive in terms of time and human resources needed, and subject to human error.

Thus, it would be beneficial to have a way to install operating systems and/or other software on computers that reduces the amount of user-time involved in installing the operating systems and reduces the possibility of mistakes being made.

SUMMARY

Using task sequences to manage devices is described herein.

According to one aspect, a user-defined or user-selected task sequence is received. The task sequence is converted into an ordered series of steps, and the series of steps are performed, in accordance with their order, in managing a device over a network. In certain implementations, the ordered series of steps are steps for automatically deploying an operating system on the device.

BRIEF DESCRIPTION OF THE DRAWINGS

The same numbers are used throughout the document to reference like components and/or features.

DETAILED DESCRIPTION

Figure 1:
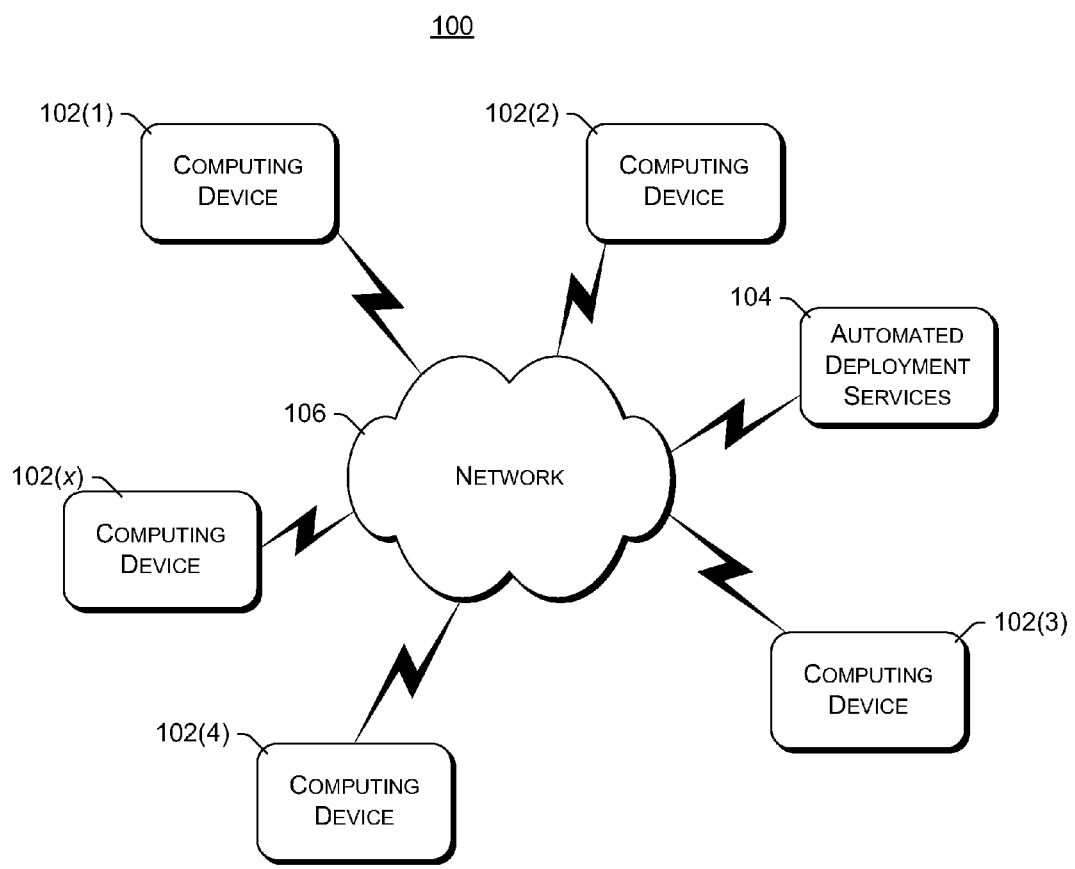
FIG. 1 illustrates an example network environment.

FIG. 1 illustrates an example network environment 100. In environment 100, multiple (x) computing devices 102(1), 102(2), . . . , 102(x) and automated deployment services 104 are coupled to a network 106. Network 106 is intended to represent any of a variety of conventional network topologies and types (including wire and/or wireless networks), employing any of a variety of conventional network protocols (including public and/or proprietary protocols). Network 106 may include, for example, a local area network (LAN), a wide area network (WAN), portions of the Internet, and so forth. Environment 100 represents any of a wide variety of environments, including, for example, data centers (e.g., Internet data centers (IDCs)), office or business environments, home environments, educational or research facilities, retail or sales environments, and so forth.

Computing devices 102 can be any of a variety of conventional computing devices, including desktop PCs, workstations, mainframe computers, server computers, Internet appliances, gaming consoles, handheld computers, cellular telephones, personal digital assistants (PDAs), etc. One or more of devices 102 can be the same types of devices, or alternatively different types of devices. Additionally, even if multiple devices are the same types of devices, the multiple devices may still be configured differently (e.g., two devices 102 may be server computers, but may have different hardware configurations, such as different processors, different amounts of RAM, different sizes of hard disk drives, and so forth).

Automated deployment services 104 represent one or more computing devices that manage the configuration of and installation of software on computing devices 102. All computing devices 102 in environment 100 may be managed by the same automated deployment services 104, or alternatively multiple services 104 may be present with different services 104 managing different devices 102.

During operation, when a new computing device 102 is added to environment 100, the newly added computing device 102 is automatically configured and software (e.g., an operating system) is automatically installed on the device 102 by automated deployment services 104. If multiple devices 102 are added, then the configuration and software installation on the multiple devices 102 can be managed simultaneously by automated deployment services 104.

Additionally, one or more computing devices 102 may be re-configured after being added to environment 100. For example, a particular computing device 102 may operate for a period of time (e.g., on the order of minutes, hours, days, months, etc.) performing one function, and then an administrator may decide that a different function is desirable (e.g., change from being a server computer to a workstation computer, from a web server to a local file server, etc.).

Auto Deployment Architecture and Operation

Figure 2:
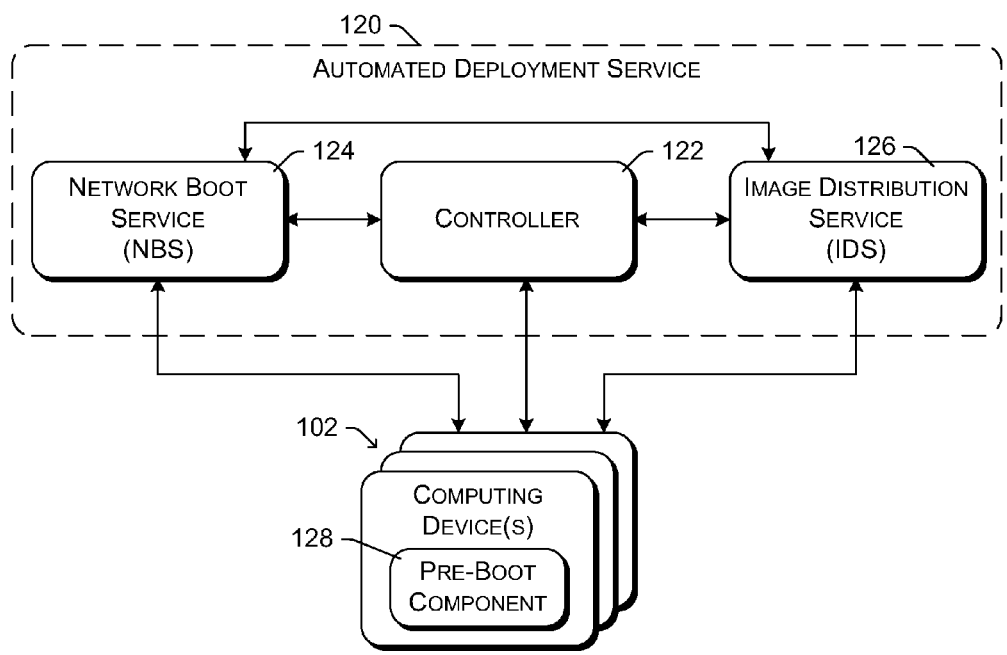
FIG. 2 illustrates an example automated deployment service.

FIG. 2 illustrates an example automated deployment service 120. Automated deployment service 120 may be, for example, automated deployment services 104 of FIG. 1. Automated deployment service 120 includes a controller 122, a network boot service (NBS) 124, and an image distribution service (IDS) 126. Automated deployment service 120 manages the configuration of computing devices 102, as well as the installation of software on computing devices 102. The software installed on computing devices 102 typically includes an operating system, and/or one or more other application programs. One or more of controller 122, network boot service 124, and image distribution service 126 can be deployed on the same device, or alternatively across multiple devices.

The specific manner in which computing devices 102 are to be configured and the specific manner in which software is to be installed on devices 102 can vary by device. In certain embodiments, a sequence of tasks can be defined that describes what actions are to be taken by automated deployment service 120 in configuring and/or installing software on a particular device 102. Tasks and task sequences are discussed in more detail below (e.g., under the heading Task Sequences and elsewhere).

Controller 122 keeps a record of devices 102 that are being managed by automated deployment service 120, what action(s) automated deployment service 120 should take the next time each of the devices 102 is booted, and what operations can be performed on each device 102. Controller 122 operates as the control point for automated deployment service 120 and the devices 102.

Network boot service 124 enables a device 102 to boot up in a particular manner desired by network boot service 124, such as booting to the operating system on a disk of the device 102, a virtual floppy on the device 102, or to a deployment agent at the device 102. Network boot service 124 detects when one of the devices 102 is being booted, and optionally indicates to the device how the device should boot (based on information that service 124 receives from controller 122). Network boot service 124 may also generate and/or download to a device 102 one or more programs to be executed that assist in the automated deployment of the operating system.

Image distribution service 126 stores images that can be deployed onto the hard disks of the devices 102. These images are used to install an operating system on a device 102, as discussed in more detail below.

Each computing device 102 includes a pre-boot component 128 that allows the device 102 to communicate with controller 122, prior to any operating system being executed on the device 102 (and even prior to any operating system being installed on the device 102). Pre-boot component 128 can be implemented in hardware, software, firmware, or combinations thereof In one implementation, the pre-boot component 128 is implemented in accordance with the Preboot Execution Environment (PXE) Specification Version 2.1 (or alternatively other versions), available from Intel Corporation of Santa Clara, Calif. Additional information regarding PXE is available from Intel Corporation of Santa Clara, Calif. Alternatively, pre-boot component 128 can be implemented in different manners, such as using BOOTP (Bootstrap Protocol). Additional information describing BOOTP can be found in the Network Working Group Request for Comments (RFC) 951.

Figure 3:
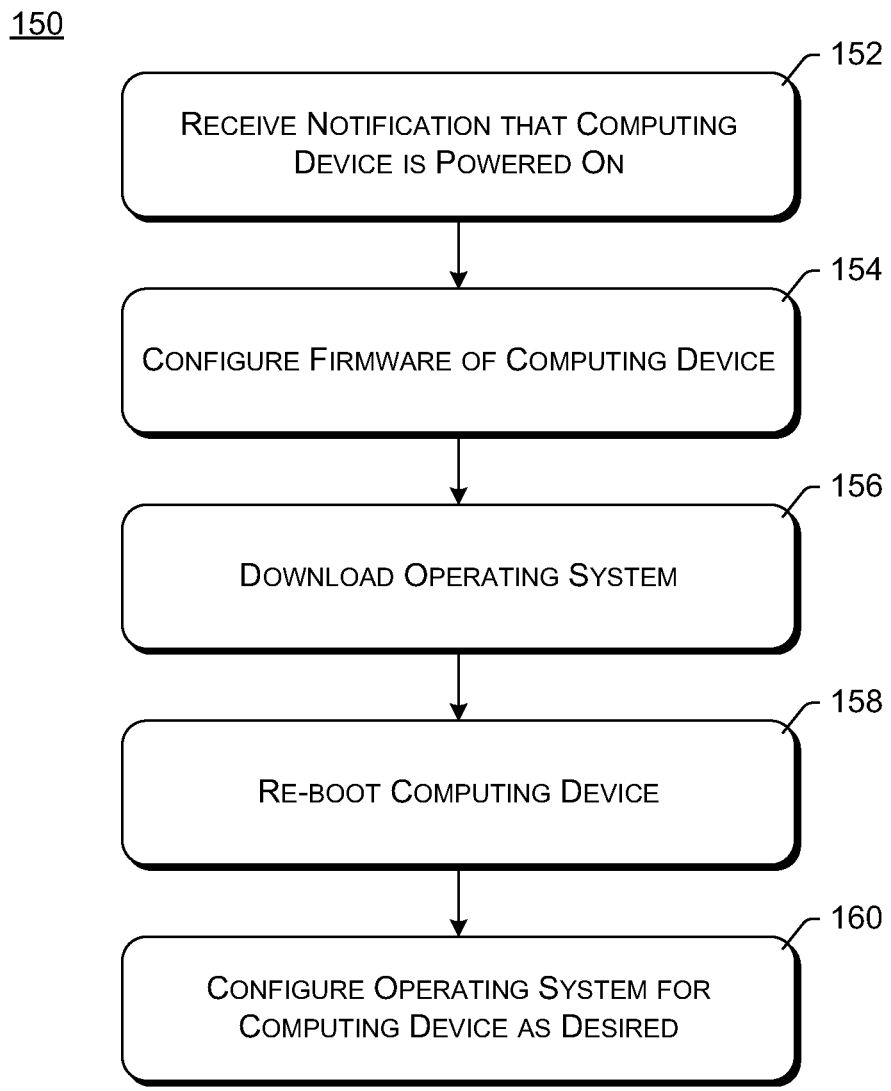
FIG. 3 is a flowchart illustrating an example process that automatically deploys an operating system on a computing device.

FIG. 3 is a flowchart illustrating an example process 150 that automatically deploys an operating system on a computing device. The process of FIG. 3 is performed by automated deployment service 120 of FIG. 2, and may be implemented in software, firmware, hardware, or combinations thereof.

Initially, a notification that the computing device has been powered on is received by the automated deployment service (act 152). This notification can take any of a variety of forms and can be implemented in any of a variety of manners. In implementations where the pre-boot component 128 is implemented in accordance with the PXE Specification, this notification can be a PXE request that is issued as part of a DHCP (Dynamic Host Configuration Protocol) message request, such as a DHCPDISCOVER message request. This PXE request can be implemented by setting an option in the DHCP message request that identifies the requesting device 102 as a PXE client.

In response to receiving the notification in act 152, network boot service 124 in conjunction with controller 122 configures the firmware of the computing device 102 (act 154). Network boot service 124 obtains, from controller 122, information describing how this particular computing device 102 is to be configured. Different aspects of the firmware of the computing device 102 can be configured, such as the setting of BIOS (Basic Input/Output System) parameters and the setting of RAID (Redundant Array of Independent Disks) parameters. The specific firmware settings that a device 102 should be configured with can be determined in a variety of different manners, and in one implementation the settings are input by a system administrator of the automated deployment service or the environment where the automated deployment service is employed.

The configuration of act 154 can be implemented in different manners. In one implementation, a set of instructions (e.g., a software program(s)) is downloaded from network boot service 124 to device 102. This set of instructions includes instructions that, when executed by device 102, cause the firmware of device 102 to be configured as desired. Alternatively, a set of instructions that receives commands over the network from network boot service 124 may be executed by device 102 and the commands to configure the firmware of device 102 as desired may be sent to device 102 by network boot service 124.

After the firmware is configured on the device 102, the device 102 may optionally be re-booted. Whether the device 102 is re-booted is dependent, at least in part, on the manner in which the firmware is configured.

After the firmware is configured in act 154 (and after the device 102 is re-booted, if it is re-booted), the operating system is downloaded to the device 102 (act 156). In certain embodiments, the operating system is an operating system image that is copied from the image distribution service 126 to the device 102. Prior to downloading the operating system, additional programs may be copied to the device 102, such as a temporary operating system (also referred to as a deployment agent), to facilitate downloading of the operating system image.

Once the operating system is downloaded to the device 102, the device 102 is re-booted (act 158). When re-booting in act 158, the device 102 is booted into the newly downloaded operating system. Additional configuration of the operating system for the computing device 102, as well as other parameters for the computing device 102, can then be initiated as desired by the automated deployment service (act 160). A variety of different parameters can be set in act 160, such as configuring the name of the computing device, passwords and/or IDs for users of the computing device, a static IP (Internet Protocol) address of the computing device, and so forth.

Furthermore, in act 160 additional software may be installed on the computing device 102. Any of a variety of software packages can be installed, such as reference programs, utility programs, productivity programs (e.g., word processing software, spreadsheet software, database software, computer aided design software, and so forth), recreational programs (e.g., video games designed to be played locally on the device 102 or via an on-line service), entertainment programs (e.g., audio and/or visual media presentation programs), and so forth.

Figure 4:
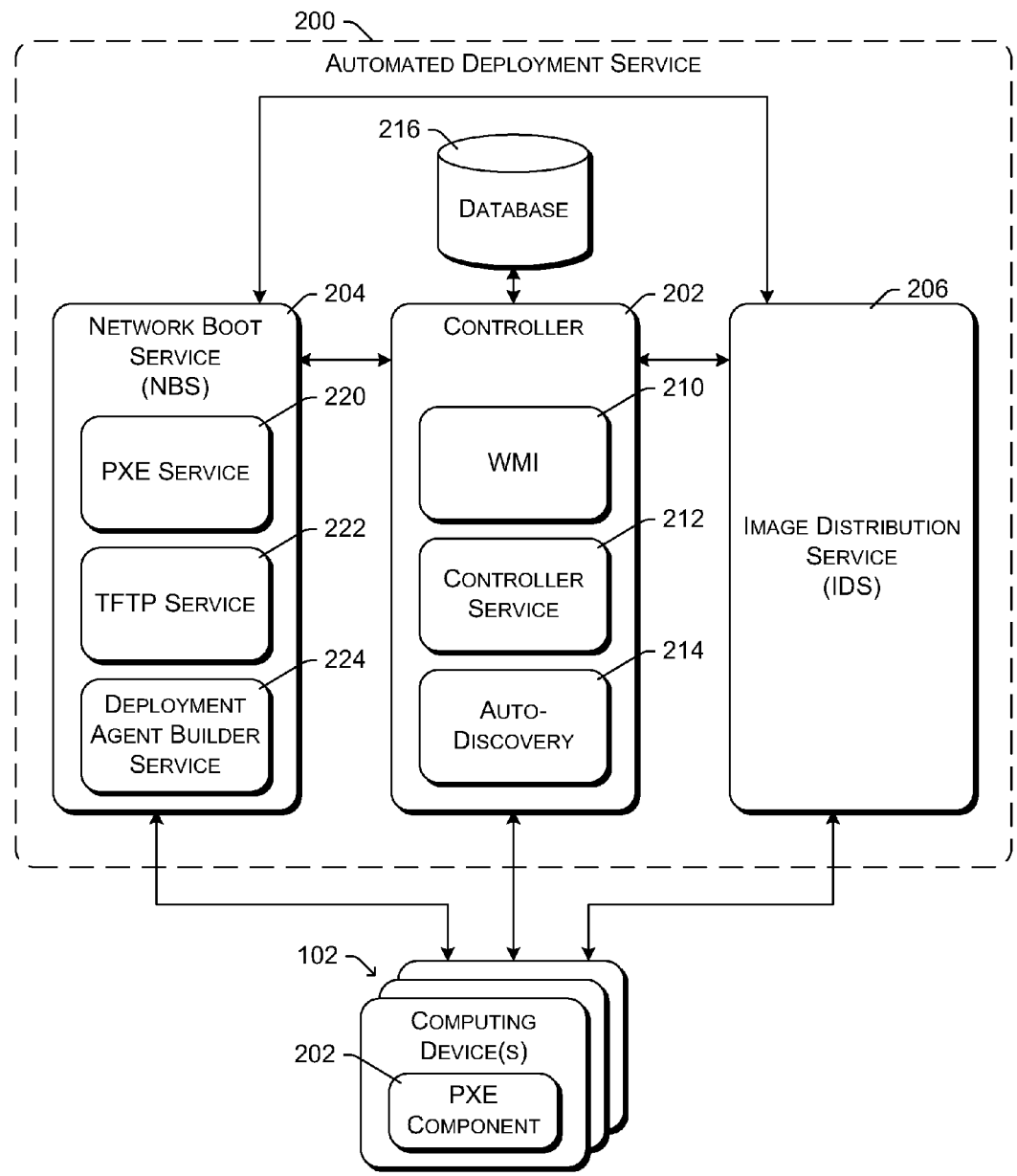
FIG. 4 illustrates example components of an automated deployment service in additional detail.

FIG. 4 illustrates example components of an automated deployment service in additional detail. The automated deployment service 200 of FIG. 4 is an example implementation of the service 120 of FIG. 2. Automated deployment service 200 includes a controller 202, network boot service (NBS) 204, and image distribution service (IDS) 206, which are analogous to and operate analogous to controller 122, network boot service 124, and image distribution service 127 of FIG. 2.

Controller 202 includes a Windows Management Instrumentation (WMI) interface 210, a controller service 212, and an auto-discovery component 214. Controller 202 is also coupled to a database 216, which is a relational database that maintains information related to devices 102 being managed by controller 122 and task sequences that can be performed on those devices. WMI interface 210 is an object model interface which provides an object model of database 216—information can be obtained from database 216 by way of WMI interface 210.

Controller service 212 is a control module for controller 202. Controller service 212 manages communications with the image distribution service 206 and network boot service 204. Controller service 212 also manages task sequences, maintaining a record of what step(s) are currently being performed on devices 102 and what step(s) are next to be performed on devices 102 in deploying software to the devices 102.

Auto-discovery component 214 receives notifications from devices 102 as the devices are booting (e.g., from operating systems booting on the devices 102). These notifications allow the devices 102 to be identified by controller 202. Controller service 212 maintains a record (e.g., in database 216) of devices that controller 202 manages, and auto-discovery component 214 allows controller service 212 to identify which devices are currently running on the network and/or have just been booted on the network. Auto-discovery component 214 (and/or PXE service 220 discussed below) also allows controller service 212 to determine when a device 102 has just been booted on the network and thus allows controller service 212 to know that it should check for any steps that are to be performed on the device.

Network boot services 204 includes a Preboot Execution Environment (PXE) service 220, a Trivial File Transfer Protocol (TFTP) service 222, and a deployment agent builder service 224. PXE service 220 detects PXE requests from devices 102, and communicates with controller 202 to determine what action to take in response to each PXE request. Some information regarding what actions to take in response to PXE requests can also be received from controller 202 and cached in network boot service 204. The action taken in response to a particular PXE request may involve a response being sent from network boot service 204 to the requesting device 102 informing the device 102 of particular actions it should take, or alternatively the action may be to simply ignore the PXE request.

TFTP service 222 is a file server that can download requested files to devices 102. These files can be generated at network boot service 204 (e.g., by deployment agent builder service 224), or obtained by TFTP service 222 from some other source for download (e.g., obtained from database 216). Network boot service 204 may also maintain a cache of files previously downloaded to a device 102, and TFTP service 222 may access this cache to obtain the files for download to a requesting device 102.

Deployment agent builder service 224 dynamically builds a deployment agent for a particular device 102 based on information describing the particular device 102. A deployment agent loader runs on the device 102 and returns to builder service 224 information describing the device 102. This information includes, for example, the hardware installed on the particular device 102 so that the deployment agent can be generated with all the necessary device drivers to run on that device 102. In one implementation the deployment agent is a native mode Windows NT® operating system kernel. This deployment agent can also be referred to as a temporary operating system. The deployment agent, when running on a device 102, creates an environment from which the final operating system can be installed on the device 102, as discussed in more detail below.

FIGS. 5a-5f are a flowchart illustrating an example process 300 that automatically deploys an operating system on a target computing device. The process of FIGS. 5a-5f is performed by automated deployment service 200 of FIG. 4 and a computing device 102 of FIG. 4, and may be implemented in software, firmware, hardware, or combinations thereof For ease of explanation, acts performed by the automated deployment service are shown on the left-hand side of FIGS. 5a-5f, while acts performed by the target device (the computing device on which the operating system is being deployed) are shown on the right-hand side of FIGS. 5a-5f. FIGS. 5a-5f are discussed with additional reference to FIG. 4.

Figure 5A:
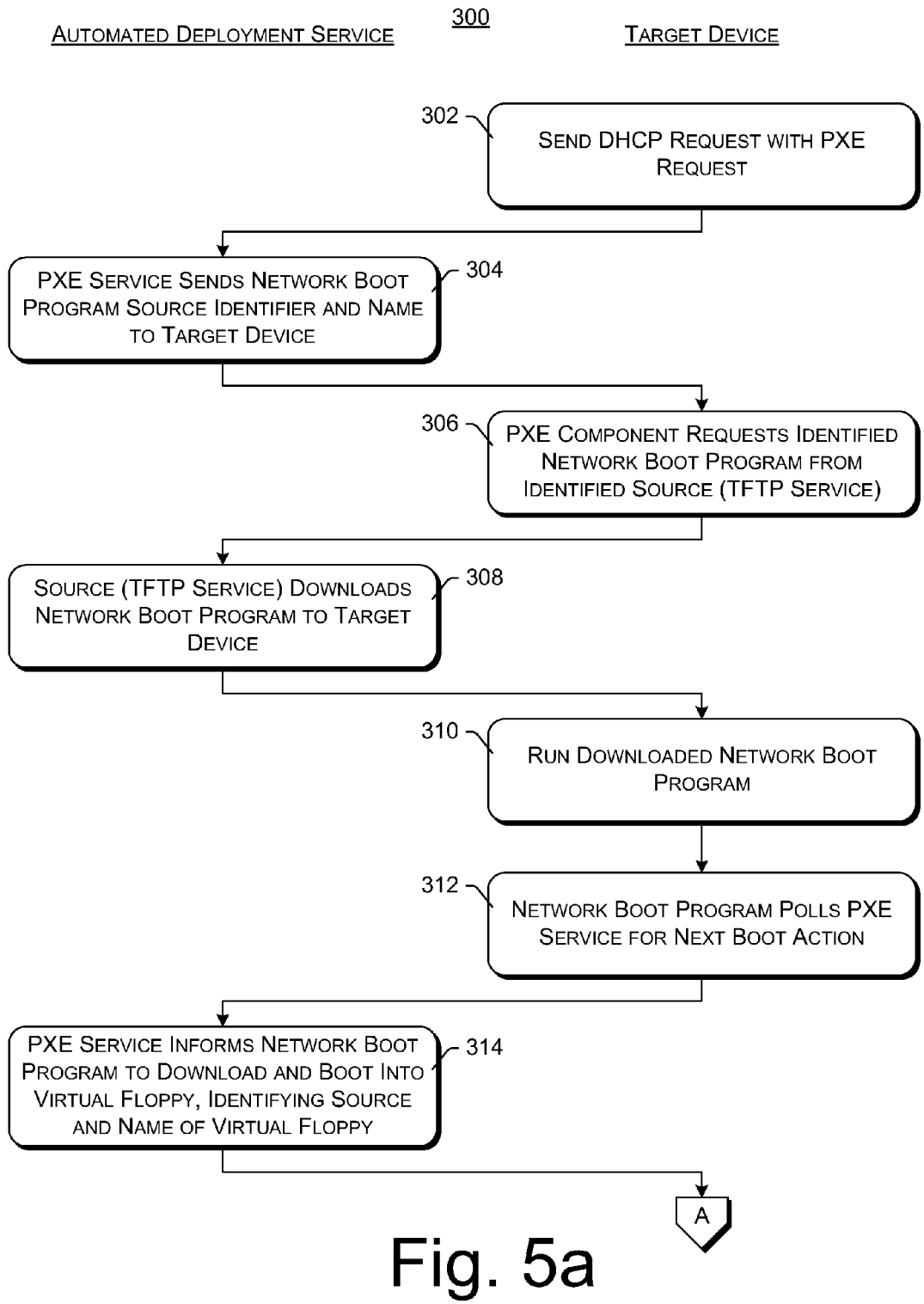
FIGS. 5a, 5b, 5c, 5d, 5e, and 5f are a flowchart illustrating an example process that automatically deploys an operating system on a target computing device.
Figure 5B:
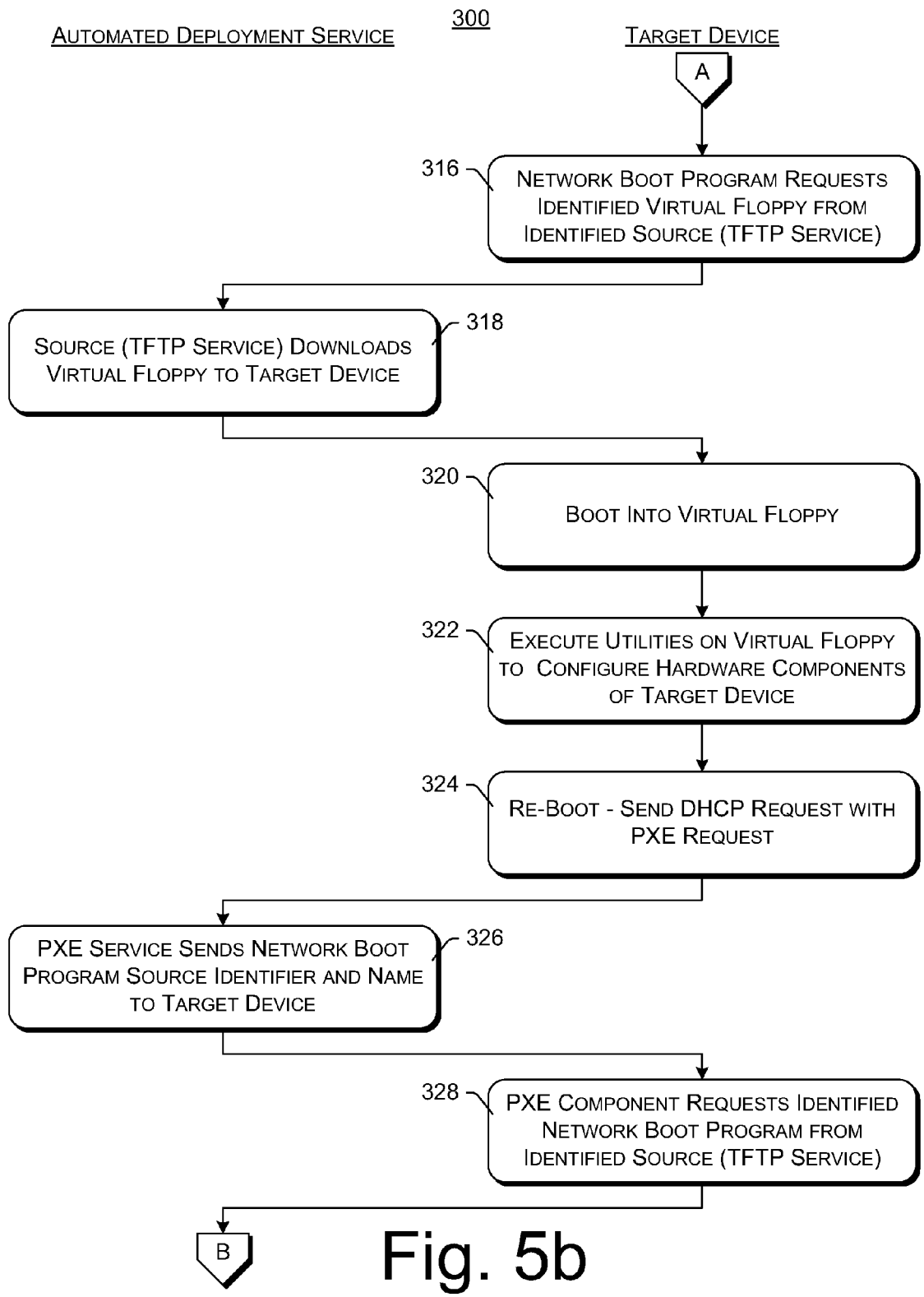
Figure 5C:
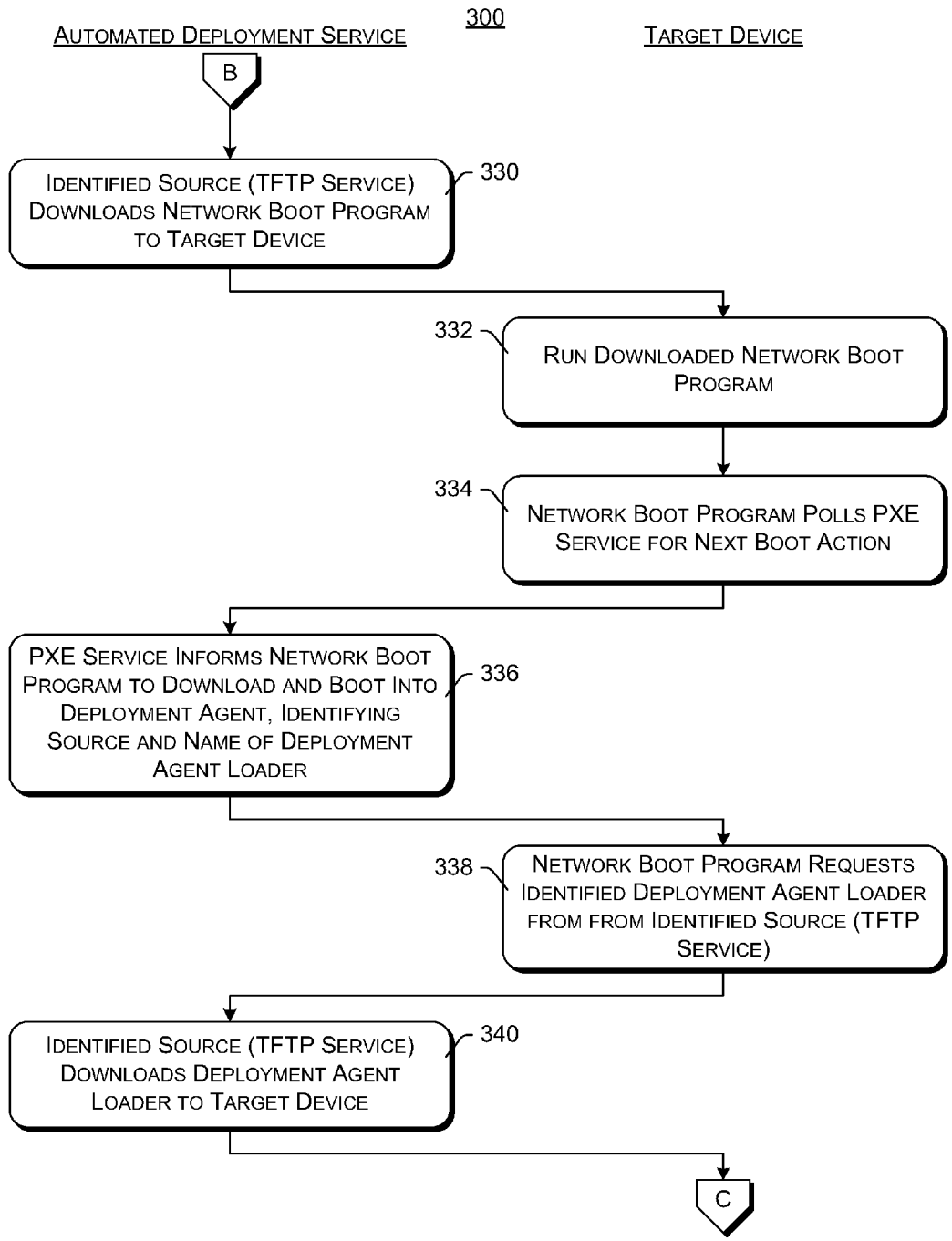

Initially, the target device transmits a DHCP request that includes a PXE request (act 302 of FIG. 5a). The DHCP request including the PXE request is sent by the target device each time the target device is powered on or re-booted. The PXE service 220 detects the PXE request and responds to the target device with an identifier of a source of a network boot program and a name of the network boot program (act 304). The network boot program is a program that can be downloaded to the target device and executed on the target device.

The network boot program allows the target device to configure and use RAM disks on device 102. The network boot program is typically a small program (relative to the operating system being deployed on the target device), and usually does not provide the same robust operation as the operating system being deployed on the target device. The same network boot program can be used for multiple computing devices 102, or alternatively different network boot programs can be used for different devices 102.

Automated deployment service 200 maintains one or more identifiers for each of the computing devices 102 it is managing (and optionally one or more identifiers for each computing device it may manage in the future and/or managed in the past). Different identifiers can be used, but the identifiers should provide a high level of probability that the identifiers are unique (e.g., so that it is very unlikely that two or more devices 102 would have the same identifier). Examples of identifiers that can be used for a particular device 102 include the Media Access Control (MAC) address of the network card being used by the device 102 to access the network, or the System Management BIOS (SMBIOS) Universal Unique Identifier (UUID).

In some situations, multiple automated deployment services 200 may be on the same network, resulting in multiple PXE services 220 receiving the PXE request from the target device. Such situations can be handled in a variety of different manners. In some embodiments, each automated deployment service 200 is programmed or otherwise configured with identifiers (e.g., MAC addresses and/or SMBIOS UUIDs) of the various computing devices 102 that it is responsible for managing. In these embodiments, only the PXE service 220 of the automated deployment service 200 that is responsible for managing the target device will respond to the PXE request. In other embodiments, the different automated deployment services 200 may communicate with each other (or with some other device) to determine which of the services 200 is responsible for managing the target device. In other embodiments, a first-come-first-served policy is employed, so that the first response received by the target device is the response followed by the device.

The target device receives the network boot program source identifier and name, and the PXE component 230 of the target device requests the identified network boot program from the identified source (e.g., TFTP service 222) (act 306). The network boot program and source can be identified in a variety of different manners. In one implementation, the source is identified by a network address (e.g., an IP address) or Uniform Resource Locator (URL), and the network boot program is identified by a file name (e.g., made up of one or more of letters, number, symbols, punctuation marks, and so forth).

In response to the request for the identified network boot program, the identified source (e.g., TFTP service 222) downloads the requested network boot program to the target device (act 308). The target device receives the network boot program and runs the program (act 310). Once running, the network boot program sends a request to PXE service 220 for an indication of the next action the network boot program should take (act 312).

PXE service 220 receives the request from the network boot program and responds to the request by informing the network boot program to download and boot into a virtual floppy disk (act 314). As part of the response, PXE service 220 identifies the source of the virtual floppy disk and the name of the virtual floppy disk. The network boot program receives this response and requests the identified virtual floppy disk from the identified source (e.g., TFTP service 222) (act 316 of FIG. 5b). In response to the request, the identified source (e.g., TFTP service 222) downloads the requested virtual floppy disk to the target device (act 318). As part of this download, the target device copies the virtual floppy disk to a RAM disk of the target device (created by the network boot program).

The virtual floppy disk is data representing a floppy disk that can be copied to and executed from a RAM disk on the target device. Once the virtual floppy disk is downloaded to the RAM disk on the target device, the target device continues the boot process using the virtual floppy disk (act 320). One or more utility programs present on the virtual floppy disk are executed to configure the hardware components of the target device (act 322). The execution of a program(s) on the virtual floppy disk can be carried out as identified in a batch file on the virtual floppy disk (e.g., an "autoexec.bat" file on the virtual floppy disk that identifies a list of programs to be executed). The parameters for configuring the hardware components are included in the virtual floppy disk. Any of a variety of configurations can be made using the utility program(s) on the virtual floppy disk. In certain embodiments, various BIOS parameters are set and/or various RAID parameters (e.g., parameters maintained by a RAID controller at the target device) are set. The specific hardware settings for the device 102 can be determined in a variety of different manners, and in one implementation are input by a system administrator.

After the hardware components of the target device are configured, the target device is re-booted (act 324). This can be accomplished, for example, by including a re-boot command as the last command in the autoexec.bat file on the virtual floppy disk.

When the target device is re-booted, it sends out a DHCP request with a PXE request (act 324), analogous to act 302 discussed above. The PXE service 220 detects the PXE request and responds to the target device with an identifier of a source of a network boot program and a name of the network boot program (act 326), analogous to act 304 discussed above. The target device receives the network boot program source identifier and name, and the PXE component 230 of the target device requests the identified network boot program from the identified source (e.g., TFTP service 222) (act 328), analogous to act 306 discussed above. In response to the request for the identified network boot program, the identified source (e.g., TFTP service 222) downloads the requested network boot program to the target device (act 330 of FIG. 5c), analogous to act 308 discussed above. The target device receives the network boot program and runs the program (act 332), analogous to act 310 discussed above. Once running, the network boot program sends a request to PXE service 220 for an indication of the next action the network boot program should take (act 334), analogous to act 312 discussed above.

PXE service 220 receives the request from the network boot program and knows that the virtual floppy disk has already been executed on the target device (because it was downloaded in act 318 above). So, PXE service 220 responds to the request from the network boot program by informing the network boot program to download and boot into a deployment agent (act 336). As part of this response, PXE service 220 also includes an identifier of a source of a deployment agent loader and a name of the deployment agent loader. The network boot program receives this response and requests the identified deployment agent loader from the identified source (e.g., TFTP service 222) (act 338). In response to the request, the identified source (e.g., TFTP service 222) downloads the requested deployment agent loader to the target device (act 340).

Figure 5D:
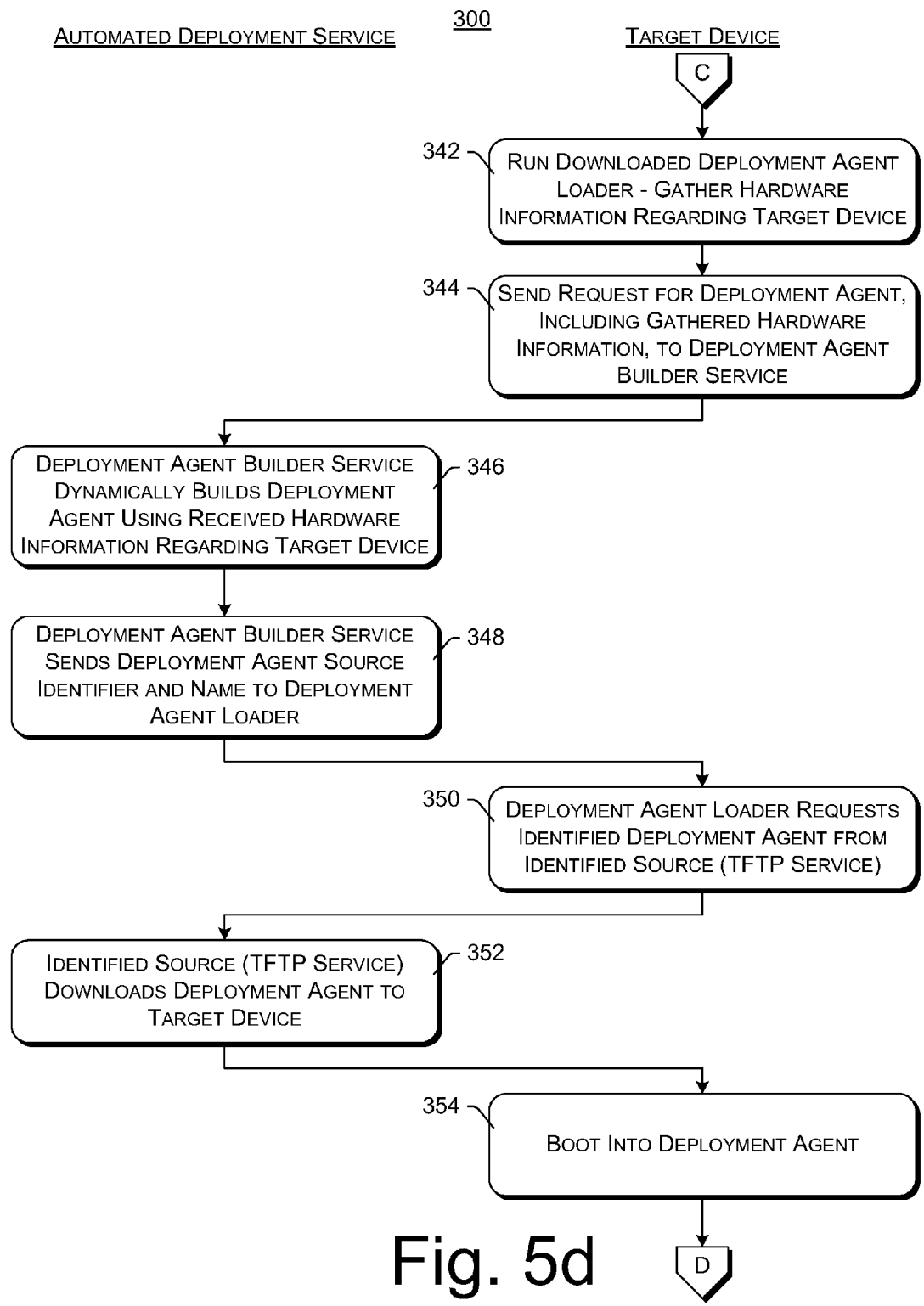
Figure 5E:
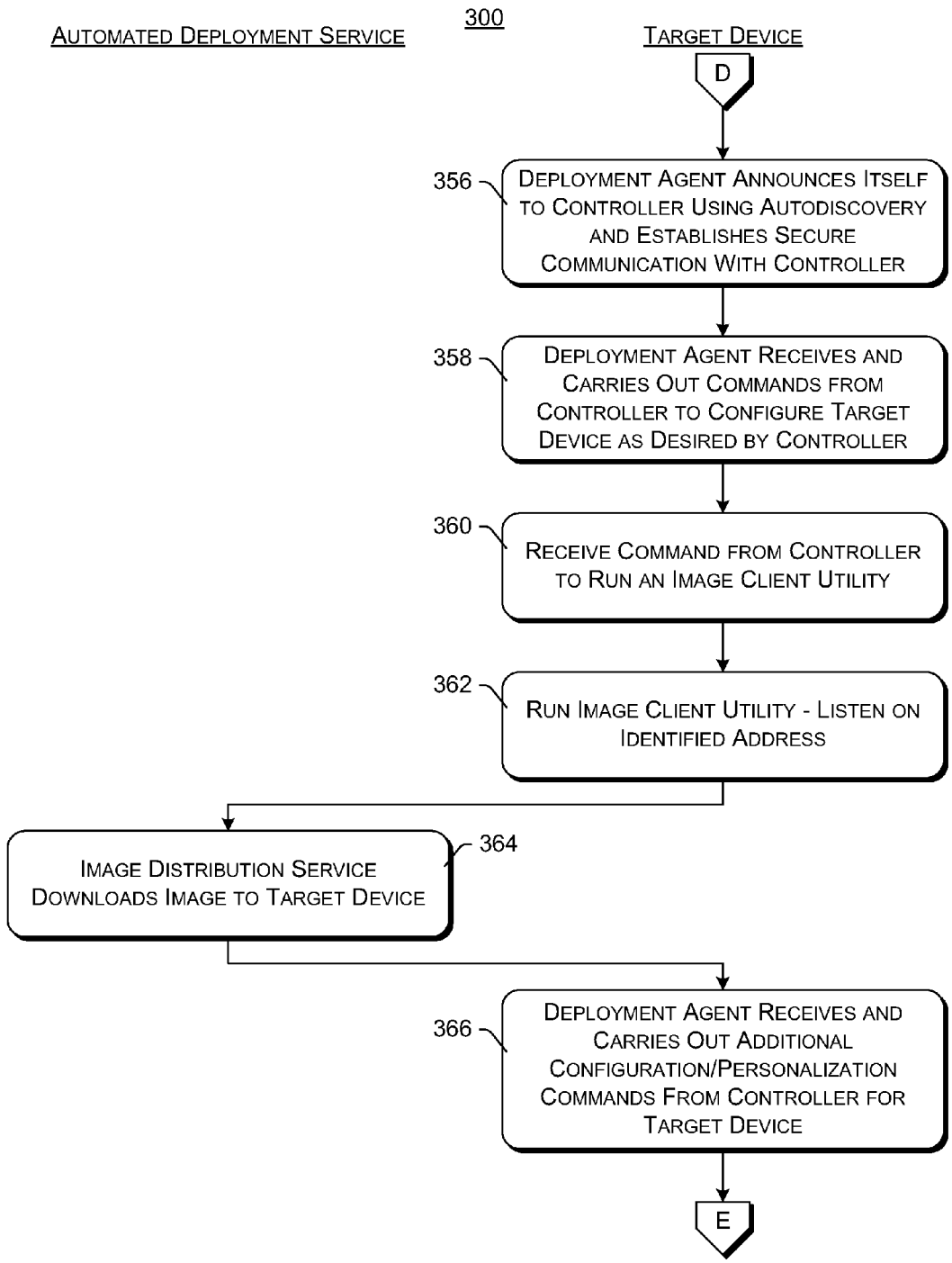

Once downloaded to the target device, the deployment agent loader is run (act 342 of FIG. 5*d*). The deployment agent loader gathers hardware information regarding the target device, such as an enumeration or listing of the various hardware components that are present in the target device. The deployment agent loader then sends a request for the deployment agent from the deployment agent builder service 224 (act 344). As part of this request, the deployment agent loader includes the information it has gathered regarding the hardware of the target device.

Deployment agent builder service 224 then dynamically generates the deployment agent based on the hardware information it receives regarding the target device (act 346). The deployment agent is dynamically generated because it is designed for the particular hardware configuration of the target device. It should be noted that deployment agents may also optionally be cached (e.g., at network boot service 204 or in database 216), so that if multiple devices 102 happen to have the same hardware configuration, then the same deployment agent need not be generated multiple times.

Deployment agent builder service 224 then sends an identifier of the deployment agent name and identifier of the source of the deployment agent to the deployment agent loader on the target device (act 348). Upon receiving the identifiers, the deployment agent loader requests the identified deployment agent from the identified source (e.g., TFTP service 222) (act 350). In response to the request, the identified source (e.g., TFTP service 222) downloads the requested deployment agent to the target device (act 352). As part of this download, the target device copies the deployment agent to a RAM disk of the target device (created by the network boot program). Once the deployment agent is downloaded to the RAM disk on the target device, the target device continues the boot process by running the deployment agent (act 354).

The deployment agent is an operating system that includes sufficient functionality to allow a full operating system to be installed on the target device. The full operating system refers to the operating system that is being deployed on the target device by automated deployment service 200. The full operating system is typically stored in nonvolatile memory of the target device (e.g., a hard disk drive) and subsequently controls operation of the target device. In contrast, the deployment agent is a temporary operating system that is typically smaller than the full operating system, and that typically is not maintained in nonvolatile memory (e.g., is run from a RAM disk). The deployment agent includes device drivers to control the various hardware components of the target device, or at least those hardware components that are used during the installation process.

When the deployment agent runs, it announces itself to auto-discovery component 214, and optionally establishes secure communication with controller service 212 (act 356). Secure communication between controller service 212 and the target device can be achieved in any of a variety of manners (e.g., using cryptography and symmetric keys and/or public/private key pairs). Establishing secure communication allows, for example, the target device to ensure that commands it receives are from the controller 202 (which the target device inherently trusts), and not from some rogue or mischievous device on the network.

The deployment agent receives and carries out commands it receives from controller 202 (act 358). These commands are to configure the target device as desired by controller 202. Any of a variety of commands can be issued by controller 202, and these commands typically are used to prepare the target device for deployment of the operating system. Examples of such commands include partitioning a hard disk (s) of the target device, formatting a volume(s) of a mass storage device of the target device, and so forth.

The deployment agent also receives a command from controller 202 to run an image client utility (act 360). The image client utility is a program that facilitates copying of an image from image distribution service 206 to the hard drive (or other storage device on which the operating system is to be deployed) of the target device. In one implementation, the image client utility is part of the deployment agent on the target device. The image client utility runs and listens on a network address (e.g., an IP address) identified by controller 202 for an operating system image from image distribution service 206 (act 362).

Controller 202 also informs image distribution service 206 to send the desired operating system image to the identified network address, and image distribution service 206 downloads the desired image to the target device by sending the desired image to the identified network address (act 364). As part of this download, the image is copied to the hard drive (or other storage device) of the target device. The image for the operating system that is stored by image distribution service 206 is a file(s) that contains a functionally identical replica of a disk. The image thus contains all of the files, with many settings and data properly configured, that constitute the operating system that can be loaded and executed on a device (some settings may have been previously made and/or may be subsequently made).

The image can be generated in any of a variety of different manners, and is typically generated using a computing device that already has an operating system installed on it. A tool is run on the computing device that generates a disk image of that computing device, which is then used as the image for that operating system. The tool can be run manually by a user at the computing device, or alternatively the tool may be activated remotely. This remote activation can be accomplished, for example, by including in the deployment agent the disk imaging tool. The computing device can then be booted into the deployment agent as discussed above, and the disk imaging tool can be run. The generated disk image can then be communicated by the deployment agent to, for example, image distribution service 206.

Any of a variety of tools can be used to generate the disk image. One such tool is the Windows® 2000 operating system System Preparation Tool (Sysprep) Version 1.1, available from Microsoft Corporation of Redmond, Wash. Alternatively, other proprietary or publicly available tools could be used.

The deployment agent also receives and carries out additional configuration or personalization commands from controller 202 (act 366). Such configuration or personalization commands in act 366 may include, for example, setting a unique hostname on the downloaded image (e.g., a name for the target device), setting the time zone, setting an administrator's password, setting a static IP address, and so forth.

Figure 5F:
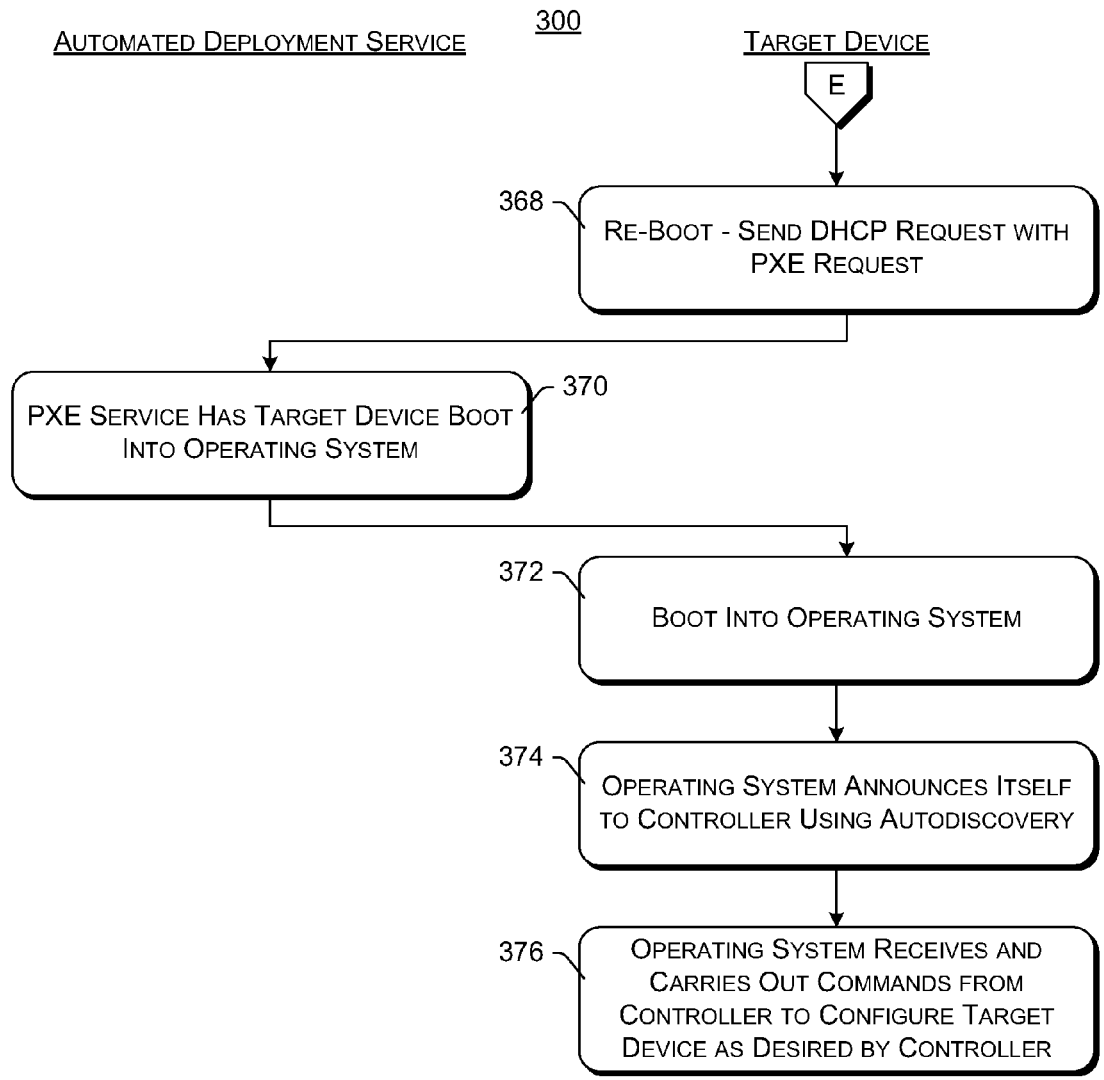

Once the operating system image is downloaded and any additional configuration or personalization commands are received from controller 202, the target device is re-booted again (act 368 of FIG. 5*f*). In one implementation, controller 202 sends a command to the target device to re-boot in act 368.

When the target device is re-booted, it sends out a DHCP request with a PXE request (act 368), analogous to act 302 discussed above. PXE service 220 receives the PXE request and knows that the operating system image has already been deployed on the target device. So, PXE service 220 has the target device boot into the deployed operating system (act 370). In one implementation, PXE service 220 sends, in response to the PXE request, an indication that the target device should boot into the operating system. Alternatively, the target device may be configured to boot into the operating system on its hard disk by default if it does not receive a response to its PXE request within a default period of time. In this alternative, PXE service 220 need not send an indication to the target device to boot into its operating system, but rather let the target device do so by default.

The target device then boots into its operating system (act 372), which is the operating system that has been deployed to the hard disk. The operating system announces itself to auto-discovery component 214 (act 374).

The operating system then receives, and carries out, commands from the controller to configure the target device as desired by the controller (act 376). Such commands may include, for example, commands to install additional programs on the target device, commands to install utilities on the target device (e.g., install a backup utility), commands to configure the operating system (e.g., create user accounts), commands to configure load balancing or applications (e.g., commands to have the target device join an existing application group), commands to have the target device run an executable (e.g., an EXE file), commands to run a script received by the operating system, and so forth.

Thus, it can be seen from FIGS. 5a-5f that a robust automated deployment service allows operating systems to be automatically deployed to computing devices. This automatic deployment can occur on computing devices that are new bare systems (e.g., systems with no operating system installed at all), as well as computing devices that already have operating systems installed. This allows computing devices to be re-purposed (e.g., the functionality of the device to be changed, such as from a web server to a workstation), allows operating systems to be re-installed in the event a computing device is corrupted or suffers a hardware failure, and so forth.

In certain embodiments, when operating systems are being deployed to multiple target devices at approximately the same time, the acts of FIGS. 5a-5f up to downloading of the image file (e.g., acts 302-362) are performed asynchronously, while the image file is downloaded to multiple target devices in parallel or concurrently. After the image file is downloaded, the acts of FIGS. 5a-5f can be continued asynchronously for the multiple target devices. Downloading the image file to multiple target devices in parallel refers to sending the data so that the same data is received by the multiple target devices. This parallel downloading may be accomplished by multi-casting the data to the multiple target devices.

By performing a portion of the deployment process asynchronously and another portion of the deployment process in parallel, the efficiency of the use of the network can be improved. Deploying the operating systems to multiple target devices involves transferring data from the automated deployment service to the target devices. Some portions of this data can be transferred asynchronously, while other portions of this data can be transferred in parallel or concurrently. For example, the amount of data transferred over the network when the image file is downloaded is typically much larger than the amount of data transferred over the network at other times (e.g., downloading of the network boot program or the deployment agent). Thus, the operating systems can be deployed out of lock-step up until the point where the large data transfer is to occur, at which point the multiple target devices are in lock-step.

Alternatively, the entire process 300 of FIGS. 5a-5f may be performed across multiple computing devices asynchronously and/or in parallel.

Numerous specific examples are given in the discussion of FIGS. 5a-5f, and it is to be appreciated that these are merely examples and that modifications to the process 300 of FIGS. 5a-5f can be made. For example, a pre-boot component other than PXE could be used. By way of another example, a file server protocol other than TFTP could be used.

Additionally, the description of process 300 discusses identifying a source and a name of an item to be downloaded (e.g., a network boot program, a virtual floppy, a deployment agent loader, a deployment agent). It is to be appreciated that this may be multiple distinct identifiers (one identifier for the source and one identifier for the name), or a single identifier (e.g., a single URL), or the identified source location may have only one file so that the file name is implicit. Furthermore, in certain embodiments components of the target device may already be aware of the source and/or name, so downloading them to the target device is not necessary. For example, the deployment agent loader may already know the source for the deployment agent, or the name for the deployment agent may have been passed to the deployment agent builder service by the deployment agent loader.

Task Sequences

A task sequence is a sequence of steps to be performed in order. Each step can be an operation or another sequence. An operation refers to a single process (e.g., initiated by controller 122 of FIG. 2) to be run on one or more devices (e.g., a script or a program). A sequence can be run on one or more devices 102. Controller 122 of FIG. 2 manages the status of each sequence, allowing each step to be completed successfully before moving onto the next step, for a given device 102. Sequences can include any operation that can be performed on a destination server, including specifying whether the destination server is to boot into a virtual floppy, boot into a deployment agent, or boot into the on-disk operating system.

A task sequence definition is stored in a file on controller 122 of FIG. 2. Alternatively, the task sequence definition could be stored in different manners, such as in a database or across multiple files. The definition can be in accordance with any of a variety of protocols, and in certain embodiments is in accordance with a markup language (e.g., Extensible Markup Language (XML)). The task sequence can thus be readily user-defined.

Task sequences can be used to carry out any of a variety of actions on a computing device. In certain embodiments, task sequences are used to carry out the automatic deployment of operating systems on target devices (e.g., process 150 of FIG. 3 or process 300 of FIGS. 5a-5f discussed above). Task sequences can also be used to carry out actions other than automatic operating system deployment as well. For example, task sequences can be used to install applications other than operating systems on computing devices (e.g., educational or recreational applications, utility applications, word processing applications, database applications, spreadsheet applications, hot fixes or updates to applications or operating systems, and so forth), perform maintenance on computing devices, retrieve and log information from computing devices, and so forth.

Figure 6:
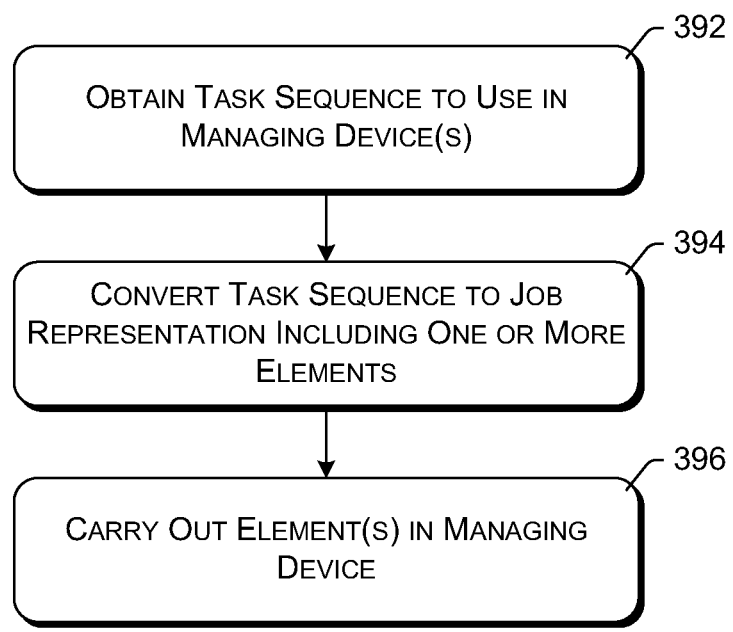
FIG. 6 is a flowchart illustrating an example process of carrying out a task sequence.

FIG. 6 is a flowchart illustrating an example process 390 of carrying out a task sequence. The process of FIG. 6 is performed by controller 122 of FIG. 2, and may be implemented in software, firmware, hardware, or combinations thereof.

Initially, a task sequence to use in managing a device or set of devices is obtained (act 392). The task sequence itself may be passed to controller 122 as a parameter, or alternatively an identifier of (e.g., pointer to) the task sequence may be passed to controller 122 and controller 122 may retrieve it. The particular task sequence obtained in act 392 can be identified by, for example, a user such as a system administrator of the automated deployment service 120 of FIG. 2 (e.g., selected by the user from a multiple possible task sequences), or alternatively can be identified by some other component or device or user. The task sequence can be an XML file, or alternatively any other representation of a series of one or more steps. The task sequence can be user-defined. Any user (e.g., a system administrator of the automated deployment service) can optionally be permitted to define task sequences to be carried out by controller 122.

The task sequence is then converted into a job representation that is to be carried out in managing the device(s) (act 394). The job representation may be, for example, a job tree, as discussed in more detail below. Alternatively, the job representation can be any of a variety of other forms. Regardless of its form, the job representation includes one or more element(s) that correspond to the step(s) of the task sequence. The elements of the job representation may have a one to one correspondence to the steps of the task sequence, or alternatively multiple elements may correspond to a single step of the task sequence, or alternatively multiple steps of the task sequence may correspond to a single element of the job representation. The element(s) of the job representation are then carried out or performed in managing the device(s) (act 396).

Reference is made herein to performing a job and/or steps on a device(s). It should be noted that the job is maintained at the automated deployment service, even when the job is performed on a device(s). However, as part of performing the job, various commands, instructions, data, and so forth may be passed to the device(s) on which the job is being performed, and that device(s) may perform any of a variety of actions based on the received commands, instructions, data, and so forth.

Figure 7:
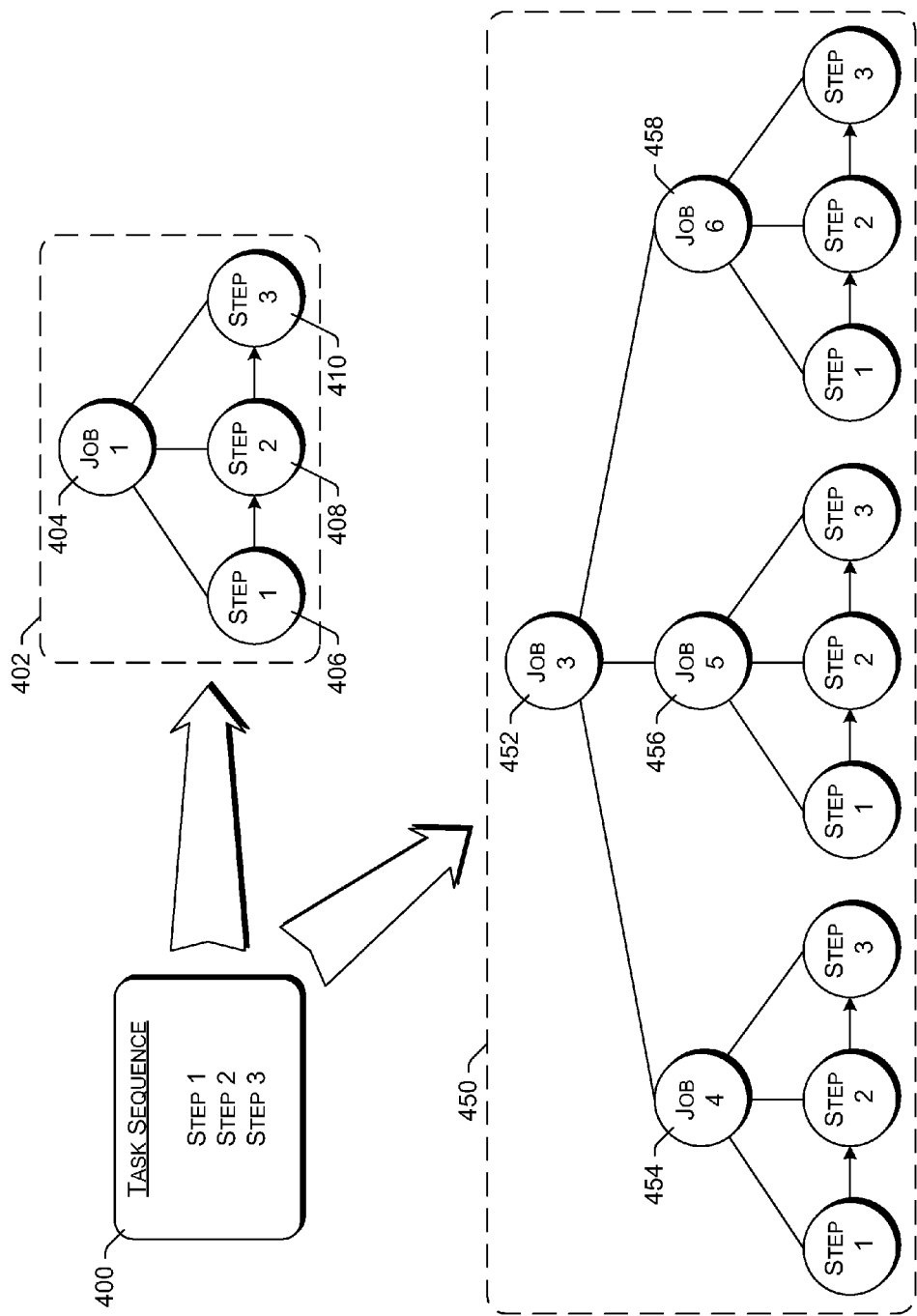
FIG. 7 illustrates an example of task sequences.

FIG. 7 illustrates an example of task sequences. A task sequence 400 is shown that includes three steps (step 1, step 2, and step 3). Task sequence 400 is a file that is maintained by controller 122 of FIG. 2. Task sequence 400 can be generated in any of a variety of manners (e.g., using any of a variety of commonly available editors to generate an XML file). Controller 122 is notified of a particular task sequence to be carried out for a particular device (or set of devices). This notification can be received from a user (e.g., a system administrator of automated deployment service 120) or alternatively another device or component.

Assuming that controller 122 is given a notification that task sequence 400 is to be carried out on a particular device, controller 122 generates a job tree 402 (also referred to as a job graph) for that particular device and task sequence. The job tree 402 includes a job node 404 as a parent node of the tree, and a child node for each step in the task sequence (nodes 406, 408, and 410). The children nodes are processed in tree-order, so that step 1 is performed before step 2, and step 2 is performed before step 3. The job tree can be implemented in any of a variety of manners, and in certain embodiments is implemented using an object model as discussed in more detail below.

The task sequence represented by job tree 402 is performed when the particular device on which the task sequence to be carried out is running on the network. If the particular device is already coupled to the network and running when the notification is received, then the steps of the task sequence can be carried out immediately. This can be determined, for example, by auto-discovery component 214 of FIG. 4 discussed above. However, if the particular device is not already coupled to the network and/or currently running when the notification is received, then the steps of the task sequence are performed when the particular device is booted on the network.

By way of example, job tree 402 may represent an operating system automatic deployment sequence. In this example, referring to FIG. 3 above, node 406 (step 1) refers to act 154 (configure the hardware of the computing device), node 408 (step 2) refers to acts 156 and 158 (download the operating system and re-boot), and node 410 (step 3) refers to act 160 (configure the operating system for the computing device as desired).

Figure 8:
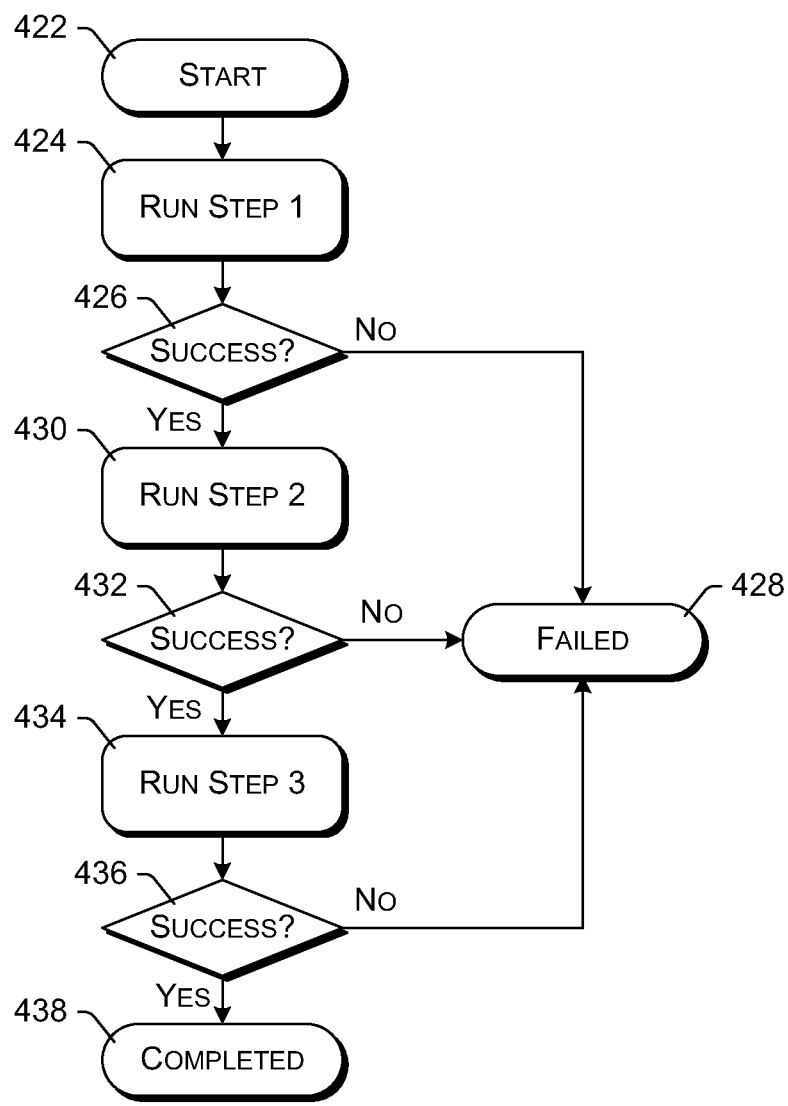
FIG. 8 is a flowchart illustrating an example process of carrying out a task sequence.

FIG. 8 is a flowchart illustrating an example process 420 of carrying out a task sequence. The process of FIG. 8 is performed by controller 122 of FIG. 2, and may be implemented in software, firmware, hardware, or combinations thereof. FIG. 8 is discussed with reference to FIGS. 2 and 3.

Initially, the process is started (act 422). As discussed above, the process may be started when notification that the task sequence is to be performed for a device is received, or when the device is booted on the network. Alternatively, the notification may also include one or more additional conditions or constraints that are to be satisfied before the steps of the task sequence are to be performed (e.g., controller 122 may be notified to wait for some other event to occur, such as some other task sequence to finish, or wait for a particular time or day to perform the steps of the task sequence).

When the process starts, step 1 of the task sequence is run (act 424). A check is then made as to whether step 1 was run successfully (act 426). Controller 122 may be informed explicitly that the step was successfully run, or alternatively implicitly. By way of example, if step 1 is configuring of the hardware of a computing device, then the component on the computing device that is responsible for configuring the hardware of the computing device (e.g., a utility program on a RAM disk of the computing device) can return a result value that serves as an explicit indication to controller 122 whether the configuration was successful. Alternatively, if no such result value is returned, the next time the computing device boots on the network it may notify automated deployment service 120 that it has booted and inquire as to the next step in the automated deployment process (e.g., by sending a PXE request discussed above). If controller 122 receives such a request, it can assume that the hardware configuration has been completed (and thus have been implicitly informed that the step was successfully completed). If controller 122 does not receive such a request within a certain period of time (e.g., a timeout period), then the step is determined to have not run successfully. The timeout period may vary for different steps as well as for different target devices.

If step 1 is not successfully completed, then the task sequence fails (act 428). If the task sequence fails, a notification of the failure may be recorded or announced in some manner. For example, the failure may be logged so that a system administrator can see the failure at a later time when reviewing the log, or an alert may be sent to the system administrator (e.g., an electronic mail (email) message, a text message to a cellular phone or pager, an automated voice telephone call, and so forth).

If, however, step 1 is successfully completed, then step 2 is run (act 430), and a check is then made as to whether step 2 was run successfully (act 432). This check can be performed analogously to act 426 discussed above. If step 2 was not run successfully, then the task sequence fails (act 428).

However, if step 2 is successfully completed, then step 3 is run (act 434), and a check is made as to whether step 3 was run successfully (act 436). This check can be performed analogously to act 426 discussed above. If step 3 was not run successfully, then the task sequence fails (act 428). However, if step 3 was run successfully, then process 420 completes successfully (act 438).

Returning to FIG. 7, task sequence 400 may also be carried out on a set of devices. Assuming that controller 122 is given a notification that task sequence 400 is to be carried out on a particular set of three devices, controller 122 generates a job tree 450 (also referred to as a job graph) for that particular set of devices and task sequence. The job tree 450 includes a job node 452 as a parent node of the tree, and a child node of job node 452 for each device in the set of devices (nodes 454, 456, and 458). Each of the children nodes 454, 456, and 458 also has a set of children nodes for each step in the task sequence (analogous to job tree 402). The children nodes for each device are processed in tree-order, so that step 1 is performed before step 2, and step 2 is performed before step 3.

Figure 9:
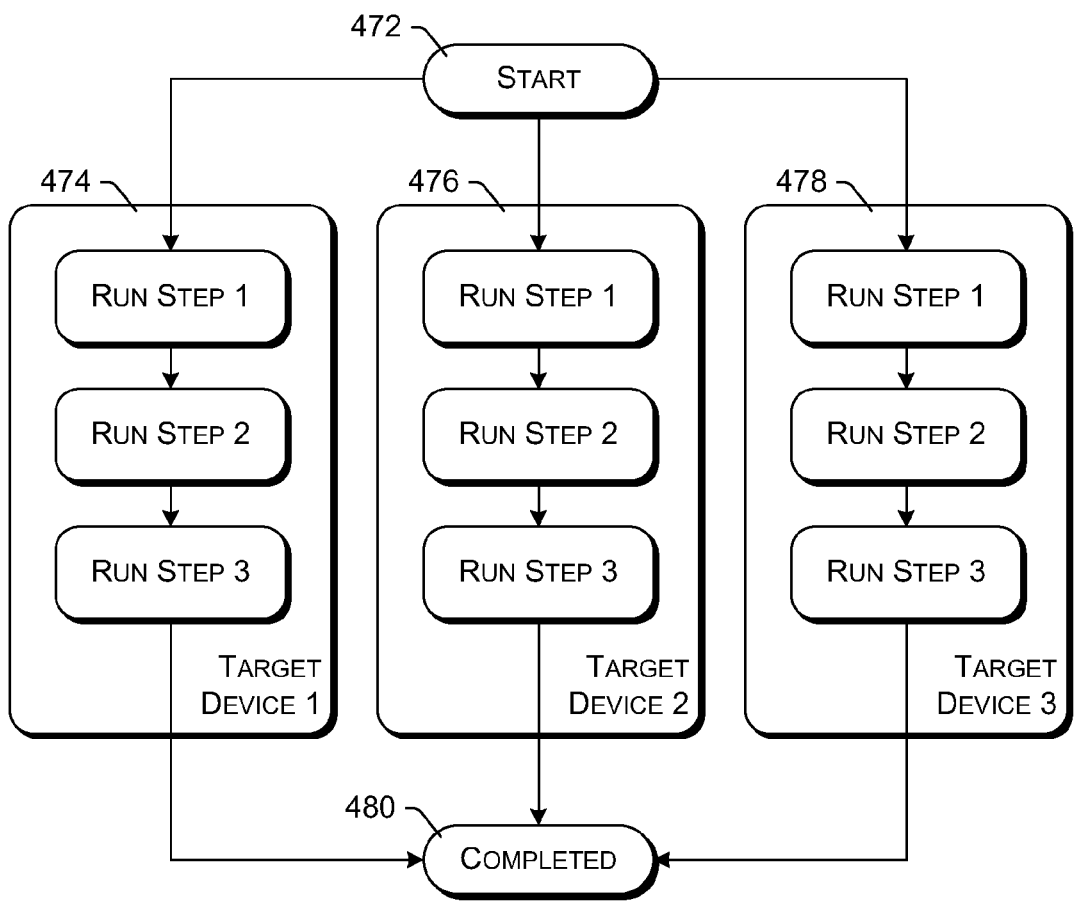
FIG. 9 is a flowchart illustrating an example process of carrying out a task sequence on a set of devices.

FIG. 9 is a flowchart illustrating an example process 470 of carrying out a task sequence on a set of devices. The process of FIG. 9 is performed by controller 122 of FIG. 2, and may be implemented in software, firmware, hardware, or combinations thereof. FIG. 9 is discussed with reference to FIGS. 2 and 3.

Initially, process 470 starts (act 472), analogous to act 422 of FIG. 8. Process 470 may start when all three target devices are booted on the network (and/or already running on the network), or alternatively the task sequence for each device may start when that particular device is booted on the network (and/or already running on the network).

Once started, the three steps are performed for the first target device (act 474), the second target device (act 476), and the third target device (act 478). On each target device, the steps are performed analogous to the steps discussed in acts 424-436 of FIG. 8 above. The three steps for the target devices can be carried out concurrently (e.g., the acts 474, 476, and 478 can all be performed at the same time). However, each act 474, 476, and 478 need not be performing the same step at the same time (e.g., step 1 may be run for the first target device while step 3 is being run for the second target device and step 2 is being run for the third target device). After all three steps are performed (or one of the steps fails) on each of the three target devices, this task sequence is completed (act 480).

Returning to FIG. 7, the job trees can be implemented using a variety of different data structures. In certain embodiments, a jobs table is used to maintain the various elements of each job. A field in the jobs table can then be used to identify a device for which each job in the table is to be performed. The devices themselves are represented in a devices table, and the appropriate entry in the device table for the target device is identified in the jobs table. Additionally, a sets table may be used to identify multiple target devices, and the jobs table can identify a set in the sets table rather than a device in the devices table.

It should be noted that the use of task sequences as described with respect to FIGS. 6-9 above also allow the automated deployment service to maintain a log or record of what operations have been performed on particular devices. For example, controller 122 can keep a log of each task sequence performed on each device (and optionally whether the device was part of a set of devices on which the task sequence was performed). Controller 122 can further keep a record of which steps in which sequences failed (if any).

Table I illustrates an example general format of a task sequence. The example of Table I is illustrated using XML, although other protocols or languages may alternatively be used.

TABLE I

```
<?xml version="1.0" encoding="utf-8" ?>
<sequence command="sample.xml" version="1"
description="Sample sequence"
xmlns="http://schemas.microsoft.com/ads/2003/sequence">
    ... zero or more <task> elements ...
    ... zero or more <sequence> elements ...
</sequence>
```

Various fields of an example of a sequence element are described below in Table II. Various fields of an example of a task element are described below in Table III. It is to be appreciated that the files in Tables II and III are only examples, and that additional fields may be included or some of the fields listed in Tables II and III may not be included.

TABLE II

| Field | Description |
| --- | --- |
| Command Attribute | Includes a reference to the file to be run. In certain implementations, contains the filename of the XML file. |
| Parameters Attribute | Includes optional arguments used by the file specified in the Command Attribute. |
| Description Attribute | Includes comment/remarks text. |
| Version Attribute | Version of the task sequence file. |
| xmlns Attribute | The default namespace for child elements. |

TABLE III

| Field | Description |
| --- | --- |
| Timeout Attribute | Specifies the timeout period for this step. |
| DoesReboot Attribute | Boolean value indicating whether this step will cause a reboot of the device. |
| Description Attribute | Includes comment/remarks text. |
| Command - Delivery Attribute | Specifies the mode in which the command is transferred to the target device. In one implementation is either "none" or "bmcp" (none indicates that the command file path is sent to the target to run, and bmcp indicates that the command file content is sent to the target to run). |
| Command - Target Attribute | Specifies the target on which the command will be executed. In one implementation is either "device" or "controller". |
| Parameter | Parameter to be used for this step. Multiple parameters may optionally be included for a single step. Variables (e.g., text between $ symbols) can optionally be used. |

Object Model

In certain embodiments, various information regarding devices being managed by a controller (e.g., controller 202 of FIG. 4) and task sequences is maintained using an object model. In the example of FIG. 4, these objects are an object model of database 216 that allow retrieval (e.g., by a system administrator or other user, or alternatively another component or device) of information from database 216 by way of WMI interface 210. Accessing these objects allows, for example, task sequences to be performed for particular devices or sets of devices.

It is to be appreciated, however, that the various information regarding devices being managed by a controller and task sequences can be retrieved in other manners using any of a variety of components other than these objects, and the information may be stored in a manner other than a relational database. For example, a database or table of information may be maintained, and one or more software modules, procedures, and/or functions made available that operate on the database or table and information contained therein.

Figure 10:
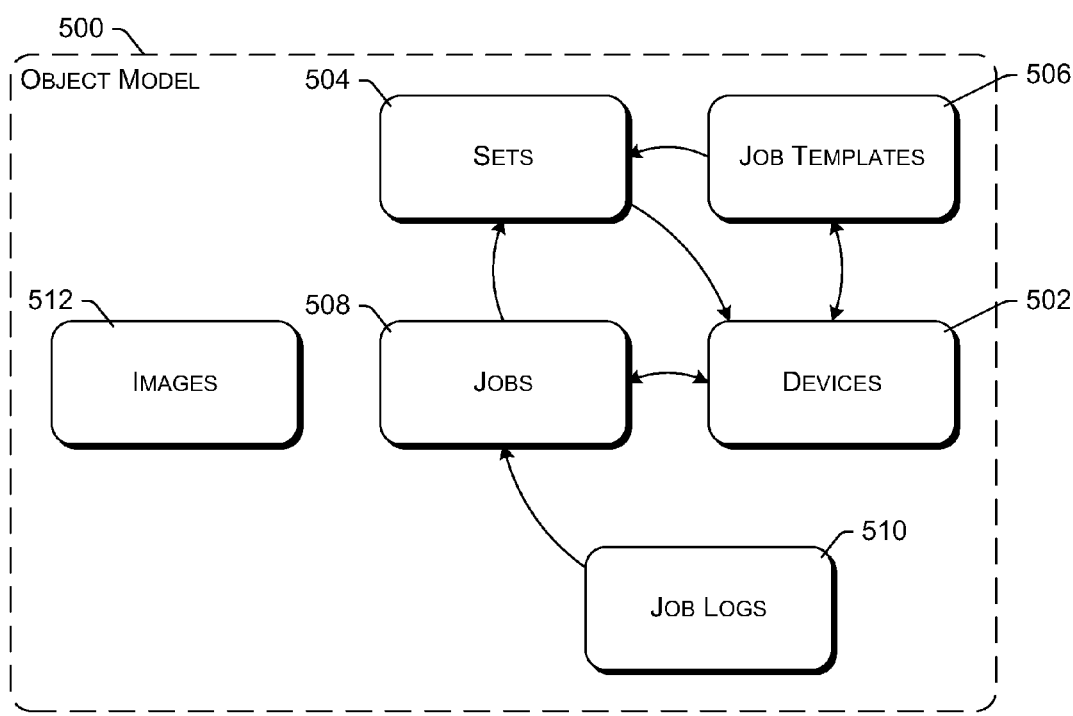
FIG. 10 illustrates an example object model that can be used in maintaining information regarding task sequences for devices.

FIG. 10 illustrates an example object model 500 that can be used in maintaining information regarding task sequences for devices. The object model 500 includes six types of objects: Devices objects 502, Sets objects 504, Job Templates objects 506, Jobs objects 508, Job Logs objects 510, and Images objects 512. Example properties and methods of these objects 502-512 are shown in Tables IV-XVII below.

Devices objects 502 represent physical devices in the network environment, such as computing devices, controllers (or other components of the automated deployment service), routers, and so forth. In certain embodiments, devices objects may also support describing the physical and/or logical arrangement of the devices. Each Devices object 502 may also identify a Jobs object 508 corresponding to a job currently being performed for the device, and/or a Job Templates object 506 corresponding to a job to be performed for the device.

A Sets object 504 represents a collection of devices. Each Sets object 504 identifies one or more other Sets objects 504 and/or one or more Devices objects 502. Each set has a unique name, and may contain none, one, or multiple devices and/or other sets. A given device may be in multiple sets. Sets are represented on the controller; the devices (including those within a set) typically have no knowledge of what sets they are in, and are not informed when they are added or removed from sets.

Job Templates objects 506 are job definitions (task sequences) available to be performed, but that are not currently being performed. Each Job Templates object 506 may also identify one or more Devices objects 502 and/or one or more Sets objects 504 on which a task sequence is to be performed in the event the device(s) and/or sets(s) become available (e.g., are booted on the network). A job template may be a 'simple' job (such as a script or program to run), or a list of simple jobs (called a task sequence). Each template has a unique name used to identify it.

Jobs objects 508 are representations of jobs in progress or jobs that have already completed. The Jobs object 508 stores the basic information, such as the description, job type, target, command and parameters. Each job is linked to one or more instances of the Jobs object. Each Jobs object 508 may also identify one or more Devices objects 502 and/or one or more Sets objects 504 on which a task sequence is to be performed in the event the device(s) and/or sets(s) become available (e.g., are booted on the network).

Job Logs objects 510 capture the output of jobs. The Job Logs objects 510 provide a record of jobs that have been run. Each Job Log is associated with a Jobs object 508, and each Jobs object 508 may be associated with multiple Job Logs objects 510. Each Job Logs object 510 identifies the Jobs object 508 that it is associated with.

An Images object 512 represents a captured volume that is available to be deployed. It might be, for example, an operating system volume captured after sysprep which can be deployed to multiple servers, an operating system volume captured without sysprep which can be deployed to a single server, or a data volume. An images object 512 can be referenced as part of the parameters field of a Jobs object 508 or a Job Templates object 506.

Example properties of the Devices object are shown in Table IV. These properties illustrated in Table IV are exposed in the WMI interface (e.g., WMI interface 210 of FIG. 4). In certain embodiments, some properties may not be exposed in the WMI interface (e.g., the ID property may not be exposed). Example methods of the Devices object are shown in Table V. These methods illustrated in Table V are exposed in the WMI interface (e.g., WMI interface 210 of FIG. 4). In certain embodiments, some methods may not be exposed in the WMI interface.

TABLE IV (Devices Object Properties)

| Property | Format | Description |
| --- | --- | --- |
| ID | Integer | Identifier for this device. |
| Name | String | Name of the target device and/or the IP address of the administrative interface. |
| Control | Integer | Whether this device is controlled by this controller. If set to TRUE, the controller will respond to PXE requests from this device and can run jobs on this device. True = device is controlled by this controller False = device is not controlled by this controller |
| State | Integer | State of the connection to the target device. (e.g., 0 = Disconnected (or device is not running agent software); 1 = Connected to pre-OS (e.g., deployment agent or network boot program); 2 = Connected to full OS (e.g., operating system image has been download and is running)) |
| AdminIPAddr | String | Network address (e.g., IP address) of administrative interface of the device (e.g., as supplied by auto-discovery). Used for communication with the device. |
| CurrentJobID | Big Integer | Job ID of the currently running PXE job. |
| JobTemplate | String | Job to run when a PXE request comes in from this device, if no PXE job is running. |
| LastDiscoveryTime | Datetime | Time last discovery packet was received from the device. |
| ADSService | Integer | Whether this device hosts an ADS service (e.g., 0 = No; 1 = Hosts the controller service; 2 = Hosts the PXE Service; 4 = Hosts the Image |

TABLE IV-continued (Devices Object Properties)

| Property | Format | Description |
| --- | --- | --- |
| | | Service). If multiple services are hosted on the same device, this value is set to the sum of the numbers above. |
| Description | String | A description of the device. |

TABLE V (Devices Object Methods)

| Method | Description |
| --- | --- |
| Manage | Places the device into either a controlled or an uncontrolled state. Includes a ControlFlag input parameter that is the value that specifies how to manage the device. |
| SetAdminIPAddr | Sets the administration network address (e.g., IP address) for the device. Includes an IPAddr input parameter that is the administration network address for the device. |
| SetJobTemplate | Sets the default job template for the device. Includes an input parameter that is to be the default job template for the device. |
| Execute | Executes a command on the device, and then returns the job identifier relating to the parent job. Optionally includes one or more of: a Command input parameter that is the path of the command to be executed, a Parameters input parameter that is the parameter(s) to be passed to the executing command, a Description input parameter that is the description for the executing command which is to be logged, a Delivery input parameter that specifies the mode of delivering the command to the target device (e.g., "none" or "BMCP"), a Timeout input parameter that specifies the period of time that the controller will allow for this command to complete, and a JobWillReboot input parameter that specifies whether the job to be executed will reboot the device. |

Example properties of the Sets object are shown in Table VI. Associated with the Sets object is a SetDevice object and a SetChildSet object, examples of which are shown in Tables VII and VIII, respectively. These properties illustrated in Tables VI, VII, and VIII are exposed in the WMI interface (e.g., WMI interface 210 of FIG. 4). In certain embodiments, some properties may not be exposed in the WMI interface (e.g., the ID property may not be exposed).

Each instance of a Sets object represents a single set, and is exposed as the Sets WMI class. Each instance of a SetDevice object represents a device member of a set, and is exposed as the SetToDevice association class. Each instance of a SetChildSet object represents a set member of a set, and is exposed as the SetToSet association class.

Example methods of the Sets object are shown in Table IX. These methods illustrated in Table IX are exposed in the WMI interface (e.g., WMI interface 210 of FIG. 4). In certain embodiments, some methods may not be exposed in the WMI interface.

TABLE VI (Sets Object Properties)

| Property | Format | Description |
| --- | --- | --- |
| ID | Integer | Identifier for this set. |
| Name | String | Name of the set. |
| Description | String | Description of the set. |

TABLE VII (SetDevice Object Properties)

| Property | Format | Description |
| --- | --- | --- |
| SetID | Integer | Identifier of a Sets object. |
| DeviceID | Integer | Identifier of a Devices object. |

TABLE VIII (SetChildSet Object Properties)

| Property | Format | Description |
| --- | --- | --- |
| SetID | Integer | Identifier of a Sets object. |
| ChildSetID | Integer | Identifier of a Sets object. |

TABLE IX

(Sets Object Methods)

| Method | Description |
| --- | --- |
| AddDevice | Adds a device as a member of the set. Includes an input parameter that is the path reference to the device to add as a member of the set. |
| RemoveDevice | Removes a device from the set. Includes an input parameter that is the path reference to the device to remove from the set. |
| AddSet | Adds a set as a member of the set. Includes an input parameter that is the path reference to the set to add as a member of the set. |
| RemoveSet | Removes a set from the set. Includes an input parameter that is the path reference to the set to remove from the set. |
| Rename | Renames the set name to the name specified. Includes an input parameter that is the new name for the set. |
| Execute | Runs a job on the devices in the set. If the job started successfully, the method returns the job identifier of the parent job. Optionally includes one or more of: a Command input parameter that is the path of the command to be executed, a Parameters input parameter that specifies the arguments given when the job is started, a Description input parameter that is the description for the executing command which is to be logged, a Delivery input parameter that specifies the mode of delivering the command to the target device (e.g., "none" or "BMCP"), a Timeout input parameter that specifies the period of time that the controller will allow for this command to complete, and a JobWillReboot input parameter that specifies whether the job to be executed will reboot the devices in the set. |
| ListMember Devices | Retrieves the list of descendent member devices. Since a set can contain nesting of sets, this method will walk through the child member sets and retrieve their member devices and enumerate the list of devices. Includes a Devices output parameter that is the array of the Devices instances that are members of the descendent set members. |

Example properties of the Job Templates object are shown in Table X. These properties illustrated in Table X are exposed in the WMI interface (e.g., WMI interface 210 of FIG. 4). In certain embodiments, some properties may not be exposed in the WMI interface. Example methods of the Job Templates object are shown in Table XI. These methods illustrated in Table XI are exposed in the WMI interface (e.g., WMI interface 210 of FIG. 4). In certain embodiments, some methods may not be exposed in the WMI interface.

TABLE X

(Job Templates object Properties)

| Property | Format | Description |
| --- | --- | --- |
| Name | String | Identifier for the JobTemplates object. |
| TargetType | Integer | Type of the target, such as sets or devices (e.g., 0 = Undefined; 1 = Sets; 2 = Devices; 3 = Controller). |
| TargetName | String | Name of the target, such as sets or devices, on which the job is to be invoked. |
| JobWillReboot | Integer (bitfield) | Specifies whether the job will reboot the device(s) on which it runs. |
| TimeOut | Integer | Specifies the timeout value for the job. |
| Delivery | Integer | Specifies the mode in which the command is delivered to the target devices (e.g., "none" or "bmcp"). |
| Command | ntext | Command that is to be executed on the target object. |
| Parameters | ntext | Parameters passed to the job command that is to be executed. |
| Description | String | Description of the job that was invoked. |

TABLE XI

(Job Templates object Methods)

| Method | Description |
| --- | --- |
| Execute | Runs a job using either template values or the optional in parameters if supplied. If the job started successfully, the method returns the job identifier of the job. Optionally includes one or more of: a TargetType input parameter that is the type of the target on which the command is to be run, a TargetName input parameter that is the name of the target on which the command is to be run, a Command input parameter that is the path of the command to be executed, a Parameters input parameter that is the parameter(s) to be passed to the executing command, a Description input parameter that is the description for the executing command which is to be logged, a Delivery input parameter that specifies the mode of delivering the command to the target device (e.g., "none" or "BMCP"), a Timeout input parameter that specifies the period of time that the controller will allow for this command to complete, and a JobWillReboot input parameter that specifies whether the job to be executed will reboot the device(s) on which it runs. |

The Jobs object is described as being separated into two objects, the JobInvocations object and the Jobs object, although alternatively these two objects can be combined into a single object. These two objects may optionally be exposed as the single WMI class Jobs. In certain embodiments, the JobInvocations object is the object that stores the tasks and/or sequences (e.g., of Table I above) to be performed. Example properties of the JobInvocations object are shown in Table XII, and example properties of the Jobs object are shown in Table XIII These properties illustrated in Table XIII are exposed in the WMI interface (e.g., WMI interface 210 of FIG. 4). In certain embodiments, some properties may not be exposed in the WMI interface. Example methods of the Jobs object are shown in Table XIV. These methods illustrated in Table XIV are exposed in the WMI interface (e.g., WMI interface 210 of FIG. 4). In certain embodiments, some methods may not be exposed in the WMI interface.

TABLE XII (JobInvocations Object Properties)

| Property | Format | Description |
|---|---|---|
| ID | Integer | Used internally by the controller to identify the particular JobInvocations object. |
| Delivery | Integer | Specifies the mode in which the command is delivered to the target devices. |
| Command | ntext | The job command that is to be executed on the target object. |
| Parameters | ntext | Parameters passed to the job command that is to be executed. |
| Description | String | Description of the job that was invoked. |

TABLE XIII (Jobs Object Properties)

| Property | Format | Description |
|---|---|---|
| JobID | Big integer | Identifier for the job that has been executed. If the same job executes again, it yields a different identifier. |
| ParentJobID | Integer | Identifier for the job which originates the job on the targets. For the root job, the identifier will be 0 and for other jobs, the identifier uses the identifier of the root job. |
| JobInvocationID | Integer | Identifier of a JobInvocation object. |
| Type | integer | Identifies the type of the job that has been executed. An example bit map is:<br>Bit 1: 0 = leaf node (no children); 1 = non-leaf node<br>Bit 2: 0 = parallel execute children; 1 = serial execute children<br>Bit 3: 0 = command does not do a reboot; 1 = command does a reboot so no completion status should be expected |
| State | Integer | Indicates the status of the task (e.g., 1 = Created; 2 = Ready to Run; 3 = Running; 4 = Completed-Success; 5 = Completed-Error; 6 = Canceled; 7 = Stopped; 8 = Unable to start; 9 = Failed; 10 = Timed Out) |
| ExitCode | Integer | The exit code returned from the job. This only has meaning if State is Completed-Success |
| StartTime | Datetime | Time stamp when task was started. |
| EndTime | Datetime | Time at which this task was completed. |
| TimeOut | Integer | Indicates the timeout value for the job. |
| TargetType | Integer | Type of the target such as set(s) or device(s). |
| TargetName | Integer | Name of the target such as set(s) or device(s), on which the job is to be invoked. |
| Username | String | Specifies the user that started the job. |

TABLE XIV (Jobs Object Methods)

| Method | Description |
|---|---|
| Stop | Stops a job that is in progress. |
| GetOutput | Retrieves the output from the job log and yields the collective result. Includes an OutputType input parameter that is the type of output to be retrieved from the job log (e.g., get the standard output, get the standard error, get all output), a Start input parameter that is the offset of the first character to return, a Length input parameter that is the number of characters to return, and an Output parameter that is the output retrieved from the job log. |
| GetOutputSize | Returns the number of characters in the output of the given type. Includes an OutputType input parameter that is the type of output to be retrieved from the job log (e.g., get the standard output, get the standard error, get all output), and an Output parameter that is the total number of characters in the output of the type specified by the OutputType parameter. |
| StartSequence | Starts the sequence at the step with the given Job ID. This is only valid on a jobs object that represents a sequence that failed executing on a single target or is yet to be run. Includes a StepJobID input parameter that is the job node from which the sequence is to be executed. |

TABLE XIV-continued (Jobs Object Methods)

| Method | Description |
| --- | --- |
| ClearJobHistory | Deletes a job that is started before StartedBefore and started after StartedAfter timestamp and returns the number of jobs deleted. If any one of the input parameter is omitted, the job history is cleared based on the input parameters provided. Includes a StartedAfter input parameter which is the time after which the job started, and a StartedBefore input parameter which is the time before which the job started. |
| ArchiveJob | Archives a job as a data stream (e.g., an XML data stream). This method works only on the root job instances. It retrieves the root job and its child jobs and their data is transformed into a data stream as output. |
| ValidateSequence | Validates the input sequence xml file with the optional xslt file against the sequence xml schema. This helper method will be useful in checking the input xml before executing sequence. Includes a SequencePath input parameter that is the path of the task sequence to be run, a StylesheetPath input parameter that specifies the path of the style sheet that transforms the multiple sequence modules into single sequence, and a Description output parameter that specifies the error description if the sequence validation fails. |

Example properties of the Job Logs object are shown in Table XV. These properties illustrated in Table XV are exposed in the WMI interface (e.g., WMI interface 210 of FIG. 4). In certain embodiments, some properties may not be exposed in the WMI interface.

TABLE XV (Job Logs Properties)

| Property | Format | Description |
| --- | --- | --- |
| JobID | Integer | Identifier for the job that has been executed. |
| Sequence | Integer | Sequence of the output from the job that was executed on the device under consideration. |
| LogTime | Datetime | Time at which the controller device received output. |
| OutputType | Integer | Specifies the type of output in this instance of JobLogs (e.g., standard output or standard error). |
| OutputData | ntext | Output from the job on the device. The sequence property can be used to recreate the output from this job on this device in correct order. |

Example properties of the Images object are shown in Table XVI. These properties illustrated in Table XVI are exposed in the WMI interface (e.g., WMI interface 210 of FIG. 4). In certain embodiments, some properties may not be exposed in the WMI interface. Example methods of the Images object are shown in Table XVII. These methods illustrated in Table XVII are exposed in the WMI interface (e.g., WMI interface 210 of FIG. 4). In certain embodiments, some methods may not be exposed in the WMI interface.

TABLE XVI (Images Properties)

| Property | Format | Description |
| --- | --- | --- |
| GUID | String | Identifier of the image. |
| Name | String | Friendly name (identifier) of the image. |
| Description | String | Description of the image. |

TABLE XVII (Images Methods)

| Method | Description |
| --- | --- |
| Add | Adds the image specified by the SourcePath to the repository of Image Server, reads the system properties of the image being added, and creates the related ImageVariables object with the properties as name-value pair. Includes a Name input parameter that is the friendly name that identifies the image being added to the image repository, a SourcePath input parameter that is the path of the source that is to be copied to the image repository, and a Description input parameter that is the description of the image to be added to the image repository. |
| Retrieve | Retrieves the image specified from the image repository and places the retrieved image on the destination specified by the DestinationPath parameter. Includes a DestinationPath input parameter that is the path where the image is to be copied to. |
| Rename | Renames the image name to the name specified. Includes an ImageName input parameter that provides the new name for the image. |

Example Implementation of Object Model

This section describes an example implementation of an object model that can be used with the automated deployment service and task sequences described herein. The object model described in this section makes reference to data centers, although the object model is also applicable to other network environments. It is to be appreciated that the example object model described in this section is only an example of objects that can be used with the automated deployment service and task sequences described herein, and that various modifications can be made to the example description in this section.

General Computing Device Example

Figure 11:
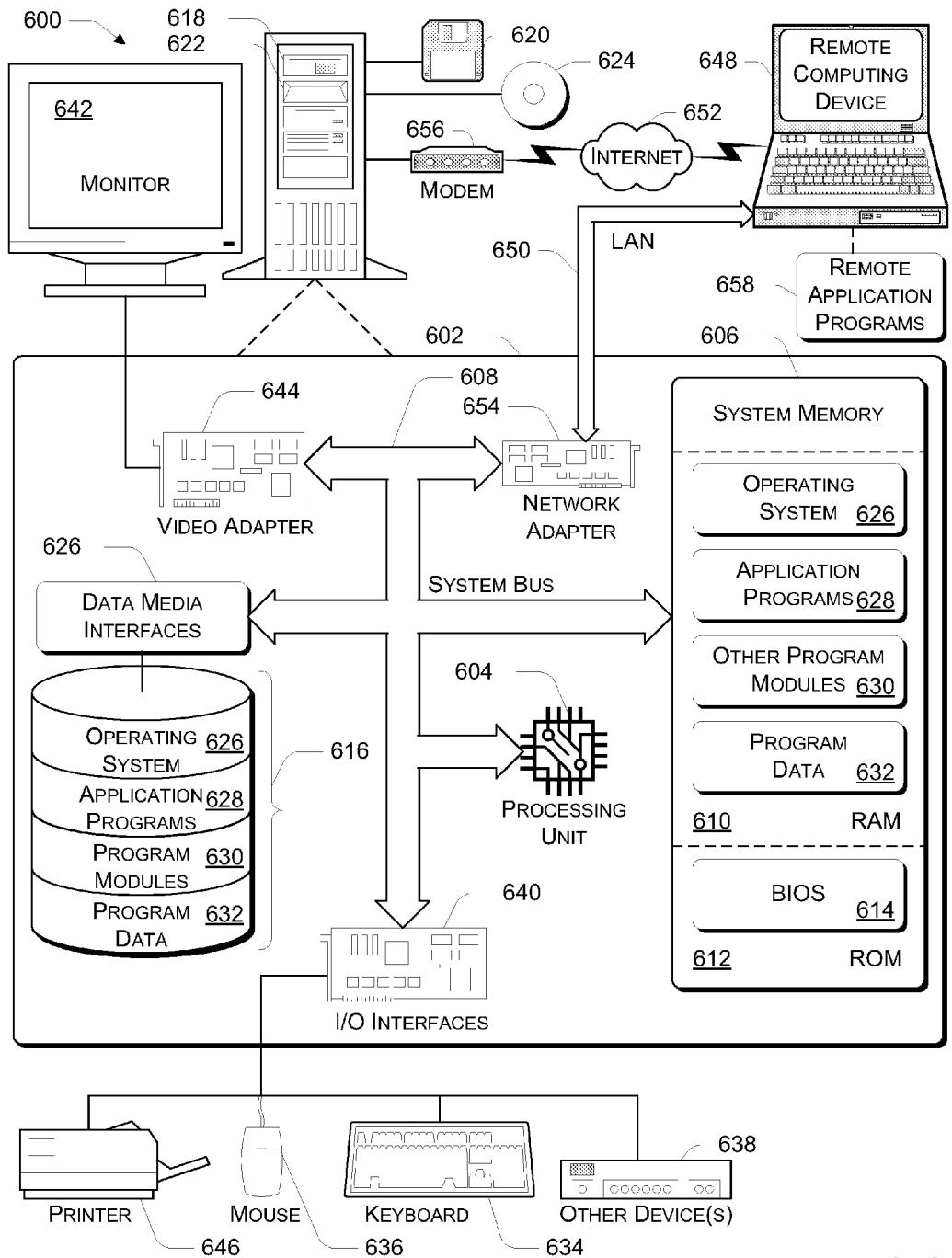
FIG. 11 illustrates a general computer environment, which can be used to implement the techniques described herein.

FIG. 11 illustrates a general computer environment 600, which can be used to implement the techniques described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the exemplary computer environment 600.

Computer environment 600 includes a general-purpose computing device in the form of a computer 602. Computer 602 can be, for example, a computing device 102 or implement automated deployment services 104 of FIG. 1, or implement automated deployment services 120 of FIG. 2, or implement automated deployment services 200 of FIG. 4. The components of computer 602 can include, but are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media. Such media can be any available media that is accessible by computer 602 and includes both volatile and non-volatile media, removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/non-volatile computer storage media. By way of example, FIG. 11 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternatively, the hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing device 602, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A computer-implemented method comprising:
    causing deployment of a full operating system to multiple target devices by:
        causing download of a deployment agent loader to each of the multiple target devices, the deployment agent loader configured to gather information regarding hardware components of each respective target device when executed at each respective target device;
        receiving the information regarding the hardware components of each respective target device from the deployment agent loader;
        dynamically generating a deployment agent that is designed for each respective target device based on the information regarding the hardware components of each respective target device, the deployment agent dynamically generated to include one or more device drivers that are configured to control one or more of the hardware components of each respective target device when executed at the respective target device;
        causing download of the deployment agent to each of the multiple target devices;
        causing download of the full operating system to each of the multiple target devices; and
        transmitting a command to each respective target device to cause the deployment agent to reboot the respective target device into the full operating system, the causing download of the deployment agent to the multiple target devices performed asynchronously, and the causing download of the full operating system to the multiple target devices performed concurrently, wherein an amount of data transferred to each of the multiple target devices concurrently to cause download of the full operating system is larger than an amount of data transferred to each of the multiple target devices asynchronously to cause download of the deployment agent.

2. The computer-implemented method as recited in claim 1, further comprising:
    establishing a secure connection with the deployment agent after causing download of the deployment agent to the multiple target devices; and
    sending one or more preparation commands to the deployment agent to cause the deployment agent to prepare the multiple target devices for installation of the full operating system.

3. The computer-implemented method as recited in claim 2, wherein the one or more preparation commands include at least one command to partition hard disks of the multiple target devices.

4. The computer-implemented method as recited in claim 1, wherein causing download of the full operating system to the multiple target devices comprises causing copying of a full operating system image file to each respective target device, the full operating system image file containing files that constitute the full operating system that can be executed on the respective target device.

5. The computer-implemented method as recited in claim 1, wherein the deployment agent comprises a temporary operating system that contains functionality to enable the full operating system to be installed on the multiple target devices.

6. The computer-implemented method as recited in claim 1, wherein at least one of the multiple target devices is not equipped with an operating system prior to causing download of the deployment agent to the at least one target device.

7. One or more computer-readable storage media having stored thereon computer-executable instructions that, when executed by one or more processors, perform a method comprising:
    causing deployment of a full operating system to multiple target devices by:
        dynamically building a deployment agent that is designed for each respective target device based on information regarding hardware components of the respective target device, the deployment agent including one or more device drivers that are configured to control one or more of the hardware components of the respective target device when executed at the respective target device;
        causing download of the deployment agent to each of the multiple target devices asynchronously;
        causing download of the full operating system to each of the multiple target devices at least partially concurrently; and
        transmitting a command to each of the multiple target devices to cause the deployment agent to reboot each respective target device into the full operating system, wherein an amount of data transferred to each of the multiple target devices concurrently to cause download of the full operating system is larger than an amount of data transferred to each of the multiple target devices asynchronously to cause download of the deployment agent.

8. The one or more computer-readable storage media as recited in claim 7, wherein dynamically building the deployment agent further comprises:
   causing download of a deployment agent loader to the multiple target devices, the deployment agent loader configured to gather the information regarding the hardware components of each respective target device when executed at the respective target device; and
   receiving the information regarding the hardware components of the respective target device from the deployment agent loader.

9. The one or more computer-readable storage media as recited in claim 7, wherein the computer-executable instructions cause the one or more processors to perform a method further comprising:
   establishing a secure connection with the deployment agent after causing download of the deployment agent to the multiple target devices; and
   sending one or more preparation commands to the deployment agent to cause the deployment agent to prepare each respective target device for installation of the full operating system.

10. The one or more computer-readable storage media as recited in claim 9, wherein the one or more preparation commands include at least one command to partition hard disks of the respective target device.

11. The one or more computer-readable storage media as recited in claim 7, wherein causing download of the full operating system to the multiple target devices comprises causing copying of a full operating system image file to each respective target device, the full operating system image file containing files that constitute the full operating system that can be executed on the respective target device.

12. The one or more computer-readable storage media as recited in claim 7, wherein the deployment agent comprises a temporary operating system that contains functionality to enable the full operating system to be installed on each respective target device.

13. The one or more computer-readable storage media as recited in claim 7, wherein at least one of the multiple target devices is not equipped with an operating system prior to causing download of the deployment agent to the at least one target device.

14. A system comprising:
   a processor; and
   one or more computer-readable storage media having stored thereon computer-executable instructions that, when executed by the processor, perform a method of causing deployment of a full operating system to multiple devices, the method comprising:
   determining a hardware configuration of each of the multiple devices;
   causing download of a deployment agent to each of the multiple devices asynchronously, the deployment agent comprising a temporary operating system that is designed for the hardware configuration of each of the multiple devices and includes one or more device drivers that are configured to control hardware components on the multiple devices that can be used to cause deployment of the full operating system on each of the multiple devices;
   causing download of the full operating system to each of the multiple devices concurrently by causing copying of an operating system image file to each of the multiple devices; and
   transmitting a command to each of the multiple devices to cause each of the multiple devices to reboot into the full operating system, wherein an amount of data transferred to each of the multiple target devices concurrently to cause download of the full operating system is larger than an amount of data transferred to each of the multiple target devices asynchronously to cause download of the deployment agent.

15. The system as recited in claim 14, wherein the deployment agent is dynamically built for each of the multiple devices based on the hardware configuration of each of the multiple devices.

16. The system as recited in claim 15, wherein deployment agent is dynamically build for each of the multiple devices by:
   causing download of a deployment agent loader to the multiple target devices, the deployment agent loader configured to gather the information regarding the hardware components of each respective target device when executed at the respective target device; and
   receiving the information regarding the hardware components of the respective target device from the deployment agent loader.

17. The system as recited in claim 14, wherein the computer-executable instructions cause the processor to perform a method further comprising:
   establishing a secure connection with the deployment agent after causing download of the deployment agent to the multiple target devices; and
   sending one or more preparation commands to the deployment agent to cause the deployment agent to prepare each respective target device for installation of the full operating system.

18. The system as recited in claim 17, wherein the one or more preparation commands include at least one command to partition hard disks of the respective target device.

19. The system as recited in claim 14, wherein causing download of the full operating system to the multiple target devices comprises causing copying of a full operating system image file to each respective target device, the full operating system image file containing files that constitute the full operating system that can be executed on the respective target device.

* * * * *